United States Patent [19]

Parker et al.

[11] Patent Number: 5,323,247

[45] Date of Patent: Jun. 21, 1994

[54] METHOD AND APPARATUS FOR HALFTONING AND INVERSE HALFTONING AND THE TRANSMISSION OF SUCH IMAGES

[75] Inventors: Kevin J. Parker, Rochester, N.Y.; Christopher M. Miceli, Alexandria, Va.

[73] Assignee: Research Corporation Technologies, Tucson, Ariz.

[21] Appl. No.: 866,049

[22] Filed: Apr. 9, 1992

Related U.S. Application Data

[63] Continuation-in-part of Ser. No. 622,056, Dec. 4, 1990, Pat. No. 5,111,310.

[51] Int. Cl.$^5$ .............................................. H04N 1/40
[52] U.S. Cl. .................................. 358/456; 358/457
[58] Field of Search ............................. 358/456–458, 358/465, 463–464, 459; 382/51

[56] References Cited

U.S. PATENT DOCUMENTS

| | | | |
|---|---|---|---|
| 3,085,878 | 4/1963 | Archer | 96/118 |
| 3,953,668 | 4/1976 | Judice | 178/6 |
| 4,084,196 | 4/1978 | Tisue et al. | 358/283 |
| 4,276,569 | 6/1981 | Kirk, Jr. | 358/298 |
| 4,308,553 | 12/1981 | Roetling | 358/75 |
| 4,341,046 | 7/1982 | Kamata | 358/75 |
| 4,377,821 | 3/1983 | Sautter et al. | 358/133 |
| 4,389,672 | 6/1983 | Bowen et al. | 358/160 |
| 4,409,623 | 10/1983 | Kobayashi et al. | 358/261 |
| 4,412,256 | 10/1983 | Henizl et al. | 358/283 |
| 4,477,833 | 10/1984 | Clark et al. | 358/80 |
| 4,630,125 | 12/1986 | Roetling | 358/280 |
| 4,657,831 | 4/1987 | Ambro et al. | 430/14 |
| 4,669,869 | 6/1987 | Sullivan | 355/84 |
| 4,700,235 | 10/1987 | Gall | 358/283 |
| 4,717,964 | 1/1988 | Abe et al. | 358/283 |
| 4,742,558 | 4/1988 | Ishibashi et al. | 382/56 |
| 4,758,886 | 7/1988 | Rylander | 358/80 |
| 4,783,838 | 12/1988 | Matsunawa | 382/51 |
| 4,786,975 | 11/1988 | Postl | 358/283 |
| 4,841,377 | 6/1989 | Hiratuska et al. | 358/283 |
| 4,885,576 | 12/1989 | Pennebaker et al. | 340/793 |
| 4,920,501 | 4/1990 | Sullivan et al. | 364/518 |
| 4,924,301 | 5/1990 | Surbrook | 358/75 |
| 4,974,067 | 11/1990 | Suzuki et al. | 358/75 |
| 4,975,786 | 12/1990 | Katayama et al. | 358/459 |
| 4,997,733 | 5/1991 | Carleer et al. | 430/7 |
| 5,010,398 | 4/1991 | Nys et al. | 358/80 |
| 5,027,078 | 6/1991 | Fan | 358/456 |

FOREIGN PATENT DOCUMENTS

0152355 8/1985 European Pat. Off. .
WO9004898 5/1990 PCT Int'l Appl. .

OTHER PUBLICATIONS

"A Survey of Techniques for the Display of Continuous Tone Pictures on Bilevel Displays", *Computer Graphics and Image Proceedings* Jarvis et al., vol. 5, pp. 13–40 (1976).

(List continued on next page.)

*Primary Examiner*—Stephen Brinich
*Attorney, Agent, or Firm*—Wigman, Cohen, Leitner & Myers

[57] ABSTRACT

A method of and system for rendering a halftone image of a gray scale image by utilizing a pixel-by-pixel comparison of the gray scale image against a blue noise mask is disclosed in which the gray scale image is scanned on a pixel-by-pixel basis and compared on a pixel-by-pixel basis to an array of corresponding data points contained in a blue noise mask stored in a PROM or computer memory in order to produce the desired halftoned image. Both digital and optically implemented halftone methods are disclosed. A method for obtaining the inverse halftone or gray scale image of a halftone image is also disclosed in which the halftone image can be comprised of clustered dots or dispersed dots, and it is not necessary to have knowledge of the screening methods or parameter. A method for transmitting and receiving a gray scale image in a compressed and decompressed manner, respectively, is disclosed for efficient facsimile transmission of images.

29 Claims, 9 Drawing Sheets

OTHER PUBLICATIONS

"Dithering with Blue Noise", *Proceedings of the IEEE,* Robert A. Ulichney, vol. 76, No. 1, pp. 56–79 (Jan. 1984).

"Review of standards for electronic imaging for facsimile systems", *Journal of Electronic Imaging,* Stephen J. Urban, vol. 1(1), Jan. 1992, pp. 5–21.

"Display of Dithered Images", *Proceedings of the SID,* Netravali et al., vol. 22/3, pp. 185–190 (1981).

J. C. Stoffel, J. F. Moreland, "A Survey of Electronic Techniques for Pictorial Image Reproduction", *IEEE Transactions,* Dec. 1981.

G. Goertzel, G. R. Thompson, "Digital Halftoning on the IBM 4250 Printer", *IBM Journal of Research and Development,* Jan. 1987.

Pirsch et al., "Transmission of Gray Level Images by Multilevel Dither Techniques", *Computers & Graphics,* vol. 7, 1983, pp. 31–44.

Yoshida et al., "Pel Pattern Predictive Coding of Dithered Images", Fujitsu–Scientific and Technical Journal, Mar. 1984, pp. 99–118.

"Digital Color Reproduction," *IBM Technical Disclosure Bulletin,* vol. 28, No. 1, Jun. 1985, pp. 438–439.

Netravali et al., "A Picture Browsing System," *IEEE Transactions on Communications,* vol. Com–29, No. 12, Dec. 1981.

METHOD AND APPARATUS FOR HALFTONING AND INVERSE HALFTONING AND THE TRANSMISSION OF SUCH IMAGES

CROSS-REFERENCES TO RELATED APPLICATIONS

This application is a continuation-in-part of U.S. patent application Ser. No. 622,056, filed Dec. 4, 1990 now U.S. Pat. No. 5,111,310 and entitled "Method and Apparatus for Halftone Rendering of a Gray Scale Image Using a Blue Noise Mask."

This application is related to U.S. patent application Ser. No. 801,929, filed Dec. 3, 1991, which is also a continuation-in-part application of U.S. patent application Ser. No. 622,056.

BACKGROUND OF THE INVENTION

The present invention relates generally to the halftoning, inverse-halftoning, and facsimile transmission of images. More particularly, the present invention relates to a method of and system for rendering an inverse-halftone from a binary image and methods and apparatus for efficiently transmitting halftone images and for recovering the gray scale image transmitted by inverse-halftoning the received halftone image.

Many printing devices are not capable of reproducing gray scale images because they are bi-level. As a result, the binary representation of a gray scale image is a necessity in a wide range of applications such as laser printers, facsimile machines, lithography (newspaper printing), liquid crystal displays and plasma panels. Gray scale images are typically converted to binary images using halftone techniques. Halftoning renders the illusion of various shades of gray by using only two levels, black and white, and can be implemented either digitally (facsimile machines, laser printers) or optically (newspaper printing).

Inverse-halftoning is the method by which an approximation of a gray scale image is reconstructed from a binary, halftone version of the original image. Digital halftoning is the process of transforming an N-bit gray scale image into a 1-bit binary image perceived to contain a gray scale. Digital inverse-halftoning is the reconstruction of a gray scale image from its halftone rendering.

It is desirable to utilize an inverse-halftoning process on a 1-bit image in many applications. In some situations, the only image available is a halftone rendering and, in order to reconstruct a gray scale image of that halftone rendering, an inverse-halftoning method must be utilized. In other cases, the system receiving the image is capable of displaying a binary display (printers, facsimile devices). Situations may also exist in which it is desirable for halftone images to be displayed on multilevel devices. For example, in comparison to laser and dot matrix printers, the dynamic range of CRT displays is large, causing the display of binary images to appear "harsh" or "loud" when viewed. Also the picture quality of binary images when viewed on multilevel devices can be greatly improved. By generating gray scale approximations to the binary images, the level of low pass filtering that must be performed by the eye on the image can be significantly reduced.

Almost all printed materials are produced by using halftone techniques. Recently, many advances in digital scanning devices have occurred, including the introduction of digital duplicating devices. The ability for such devices to process halftone images, including the ability to convert between halftone algorithms, would be highly advantageous. Also the ability to manipulate halftone images is important and extremely useful to the desk top publishing industry. However, elementary image processing operations such as filtering, decimation, interpolation, sharpening, etc., which are routinely implemented on gray scale images, are not easily performed on halftone images. Methods for the processing of binary texts and binary images are known. However, these algorithms are limited to images which are perceived as binary, and are not applicable to high frequency distributions of black and white which produce the illusion of gray.

Some work with the reconstruction of gray scale images from binary images is known, such as in U.S. Pat. No. 3,953,668 to Judice, entitled "Method and Arrangement for Eliminating Flicker Interlaced Ordered Dither images" and U.S. Pat. No. 4,377,821 to Sautter et al., entitled "Arrangement for Providing a Flickerless Order Dither Image for a Video Display." Other prior art methods are disclosed in an article entitled "Display of Dithered Images," by Netravali and Bowen, *Proceedings of the SID*, Vol. 22, No. 3, pp. 185-190, 181 and "High Quality Multi-Level Image Restoration from Bi-level Image," by Mita, Sugiura and Shimomura, *The Sixth International Congress on Advances in Non-Impact Printing Technologies Black and White and Color*, Oct. 21-26, pp. 235-236, 1990. However, these known methods range from simple low pass filtering to complicated neural networks. In general, low pass filtering that is sufficient to smooth the impulses found in binary images is also sufficient to blur the sharp features of such images. Therefore, reconstructions of gray scale images from binary images based on low pass filtering either remain grainy, or become visually displeasing because of such blurring. Neural networks require training, and thus may not be optimal over many different halftone techniques. In addition, neural network techniques do not explicitly take advantage of all of the a priori constraints on the gray scale image and power spectrum, or the nature of the halftone mask when its structure is available. Other prior art inverse-halftoning techniques require exact knowledge of the halftone screen used to produce a binary image (see Roetling, U.S. Pat. No. 4,630,125 and Fan, U.S. Pat. No. 5,027,078) or need to estimate the halftone screen. This is a disadvantage since some halftone techniques, such as error diffusion, have no regular halftone screen.

In this application, for the sake of clarity, the following conventions are used. A gray scale or multilevel image is defined as a two-dimensional light intensity function $g(i,j)$, where $i,j$ denote discrete pixel coordinates, and the value of g at any point $(i,j)$ is proportional to the gray level of the image at that point. An 8-bit gray scale is used, providing $L=256$ possible gray scale levels lying in the interval $[0, L-1]$ where gray level $1=0$ is considered black and $1=255$ is considered white. A halftone binary or bi-level image is similarly defined, with the exception that it is composed of 1-bit. Therefore, a halftoned image contains only two gray levels $[b_0, b_1]$, where $b_0:b_1$ may be considered either 0:1 or 0:255, corresponding to black or white. Preceding all reconstructions, it is assumed that an $M \times N$ pixel, 8-bit gray scale image of real and positive integers has been halftoned onto a $M \times N$, 1-bit binary image. As will be described herein, it is a goal of one aspect of the present invention to reproduce estimates of the original M×N 8-bit image which are visually acceptable such that edge and flat image regions are accurately reproduced and free from obvious or annoying artifacts, are acceptable for elementary image processing algorithms, and are capable of allowing conversion between halftone methods.

As discussed above, many information display devices are binary in nature. However, most images are continuous. Therefore, the ability to display continuous tone images on binary devices is very useful. However, the problem of displaying continuous images in a binary form has been unresolved for hundreds of years. This problem arises in many forms of media transfer, from graphic arts to facsimile machines. Virtually all printed images in books, magazines, newspapers, etc. are composed in a binary nature. Computer hard copy devices are almost exclusively binary in nature. The process of transforming continuous gray scale information into binary information which is perceived to contain a continuous tone, is called halftoning.

A continuous image is one that can be defined as "natural". It is one which contains indistinguishable transitions from one gray level to the next. A binary image is one that is composed of picture elements that are either black or white. Therefore, the display of a gray scale image on a binary output device requires that the continuous image be quantized into two levels. The binarization algorithm uses as its input the sample $g(i,j)$ and generates the sample $b(i,j) = 0$ or $1$ for the binary image. This thresholding decision can be stated as $$b(i,j) = \begin{cases} 0 \text{ if } g(i,j) < t \\ 1 \text{ if } g(i,j) \geq t \end{cases} \quad (1)$$

where $g(i,j)$ is the gray level of a pixel with coordinates $(i,j)$, and $t$ is the threshold value, an element in $[O, L-1]$.

Equation 1 describes two types of thresholding algorithms. The first type are those in which an image is segmented so that it is perceived as binary. The second type are those which distribute binary picture elements so that the resultant image is perceived to be continuous. A thresholded image which is perceived as binary provides very little, if any, information which will be useful for inverse-halftoning. The latter thresholding algorithm describes halftoning. As will be discussed later, a halftone image contains adequate information for forming a reasonable gray scale reconstruction.

Desirable halftone algorithm characteristics include: implementation simplicity; reproduction accuracy for both low frequency (or constant) and high frequency (or edges in fine detail); and the absence of visual artifacts such as low frequency Moiré pattern (aliasing) and false quantization contours (artificial boundaries). Essentially, the desired result of the halftoning process is such that the halftone images observed at normal viewing distances of 30-45 centimeters show dot dispersion which is perceived as varying gray levels, while the underlying dot structure remains unnoticed.

Halftoning can be implemented both optically and digitally. When implemented optically, the process is performed in two photographic steps. The original image is photographed through a mesh or grating called a halftone screen, and the binary character of the image is realized using a high contrast photographic material. Digital implementation of the halftone process has been thoroughly discussed in several articles, such as "A Survey of Techniques for the Display of Continuous Tone Pictures on Bilevel Displays," by Jarvis, Judice and Ninke, *Computer Graphics and Image Processing*, Vol. 5., No. 1, pp. 13-40, 1976. A brief review of several prominent halftone methods is provided next. For a complete analysis of halftone techniques, reference is made to the Jarvis et al. article, as well as others which are reported in the literature.

Halftoning methods are based on either point or neighborhood operations according to the number of points from the input gray scale image required to calculate one output point in the output binary image. A point operation refers to any operation where a one-to-one correspondence between input and output exists. The output for a given location is based only on the single input pixel at that location. In the case of digital halftoning, points correspond to pixels. In point algorithms, the halftoning is accomplished by a simple point-wise comparison of the gray scale image against a non-image, usually aperiodic (but not always) array or mask. For every point in the input image, depending on which point value (the gray scale image or the mask) is larger, either a 1 or a 0 is placed respectively at the corresponding location in the binary output image.

Neighborhood methods correspond to a many-to-one operation. The input pixel and the pixels surrounding it are used to determine the output pixel. Halftoning using neighborhood algorithms is not done by a simple point-wise comparison, but usually requires filtering operations that involve a number of points from the input gray scale image in order to calculate one point in the output image. Point operations can be implemented both digitally and optically. However, neighborhood operations are limited to digital applications. In general, point operations are faster than neighborhood operations, but neighborhood operations yield superior results.

At present, given the existing halftoning algorithms, the choice for a specific halftoning algorithm depends on the target device and always requires a trade-off between image quality and speed. Neighborhood halftoning algorithms result in a good image quality (although the image is not completely artifact free), but they are slow and cannot be optically implemented. That leaves point algorithms as the only choice for optical applications such as newspaper printing. Point algorithms are fast and are suitable for all target devices, but the output usually suffers from artifacts such as periodic artifacts and false contours.

The digital halftoning of images with multiple levels, such as gray scale levels, is known in the art. Two major techniques and several other techniques are currently in use. They are globally fixed thresholding, orthographic tone scale creation, electronic screening, ordered dither, error diffusion and blue noise mask thresholding. Each of those techniques is discussed briefly below.

Globally fixed thresholding is a simple point operation in which all gray level image pixels are compared with a fixed constant. If the gray level is greater than the constant, the result is white. If the gray level is equal to or less than the constant, the result is black. While this method preserves the high contrast components, it contains no tone scale information.

Orthographic tone scale creation manipulates a window of binary pixels to form a series of patterns, each of which represents a gray level value. Together, these patterns form a gray scale which, when printed with minimal inter-character spacing, can result in the reproduction of a continuous image. However, the resulting images can be coarse, with a loss of high frequency information.

Electronic screening is a point operation which is analogous to the optical method described above. It is also an extension to the method of globally fixed thresholding. Elements are compared with a threshold resulting in a black or white decision. The threshold, however, is not held constant. Instead, threshold levels are selected in sequential order from a two dimensional matrix defined as the halftone cell threshold set. The set of thresholds and their arrangement within the threshold set determine the properties (dot dispersion, edge and flat region preservation, etc.) of the halftone image.

Ordered dither is a point operation which represents continuous tones with clusters of dots arranged to give darker or lighter patterns. Input values are compared against a fixed sized screen, and dots are added to the dither lattice with increasing gray levels. Ordered dither techniques include white noise, cluster-dot and dispersed-dot. The disadvantages of ordered dither algorithms include loss of most fine detail and the introduction of periodic artifacts. See *Digital Halftoning* by R. Ulichney, MIT Press, Cambridge, Mass. (1987). See also R. W. Floyd and L. Steinberg, "Adaptive Algorithm for Spatial Gray Scale", *SID International Symposium Digest of Technical Papers*, pps. 36-37. The Floyd and Steinberg paper is directed to the digital halftoning of a gray scale.

The major ordered dither techniques are the clustered-dot dither and dispersed-dot dither techniques. A white noise random dither technique is seldom utilized because it produces the poorest quality image and, of the other two dither techniques, clustered-dot is by far the most used. Both of those techniques are based upon a threshold screen pattern that is of a fixed size. For example, 6×6 threshold screens may be compared with the digital input values. If the input digital value is greater than the screen pattern number, a 1 is produced and, if it is less, a 0 value is assigned. The number of levels that can be represented using either technique depends on the size of the screen. For example, a 6×6 screen can produce 36 unique levels.

More levels can be achieved with larger patterns, however, a reduction in the effective resolution occurs because the ability to transition among levels is at a coarser pitch. At the pixel rate of about 300 to 500 per inch, which is the average pixel rate of copiers and laser printers, the pattern artifacts are visible for screen patterns larger than 4×4, and, since 16 levels do not provide an adequate precision for typical continuous-tone imagery, a suboptimal resolution is usually obtained.

One solution to such a problem is disclosed by Ulichney in a paper "Dithering with Blue Noise" published in the *Proceedings of the IEEE*, Vol. 76, No. 1, Jan. 1988. In that article, a method of spatial dithering is described which renders the illusion of continuous-tone pictures on displays that are capable of only producing binary picture elements. The method produces a blue noise pattern (high frequency white noise) from a filter to provide desirable properties for halftoning. More specifically, Ulichney uses perturbed-weight error diffusion methods which when digitally implemented run at a much slower speed (approximately 50 times slower) than is attainable with the present invention.

Error diffusion techniques, such as that disclosed in the Ulichney IEEE article, are fundamentally different from ordered dither techniques in that there is no fixed screen pattern. Rather, a recursive algorithm is used that attempts to correct errors made by representing the continuous signal by binary values.

The error diffusion method described by Ulichney, and others, such as Floyd and Steinberg, also has the disadvantage that it requires scanning, convolution-style calculations and, although it can be implemented for use with copiers, facsimile machines, etc., requires local calculations. It cannot, however, be optically implemented. In addition, all error diffusion techniques, including those described by Ulichney and Floyd and Steinberg, show scanning and start-up artifacts, which are not present in the instant invention. Also, while Ulichney describes a method that produces blue noise, the blue noise patterns produced by the present invention are more isotropic than those produced by Ulichney or other error diffusion methods. Utilizing ordered dither methods produces notably periodic patterns that are even much more obtrusive than those produced by error diffusion methods.

The most recently developed halftone technique involves the use of a blue noise mask. Blue noise is the color name given to high frequency white noise. This method utilizes a point operation using a highly isotropic screen which can be implemented both digitally and optically. The mask is constructed to have unique first and second order properties when used to threshold any gray level. It is aperiodic and is void of low frequency components. The halftone image which results from the use of the blue noise mask technique maintains the quality of neighborhood operations while allowing the speed of point operations. This technique is described in U.S. patent application Ser. No. 622,056 filed Dec. 4, 1990, as referenced in the cross-reference section of this application. Unless otherwise noted, this is the technique that is used to create the halftone images utilized by the present invention.

Typically, in preparation for the application of a halftone algorithm to a gray scale image, several preprocessing steps are implemented on the gray scale image. In the first step, the image tone scale is adjusted. Typically, a histogramming point operation is used to force the gray levels near the upper and lower bounds to their respective limit of 0 or $L-1$, and to remap the gray values in between over the newly expanded range. This clipping operation is referred to as a "punch" or "snap" step. It adds dynamic range by emphasizing the dark and light regions in a halftone image that would otherwise be "flat".

The second step is sharpening. This operation may optionally be used as a compensation operation, for offsetting the effects of halftoning which tend to unsharpen an image. The sharpening step prevents the loss of fine image detail. The third and final step, applied after the sharpening step is the thresholding method as described above. After the thresholding step is performed, the desired halftone image has been generated. The particular and preferred thresholding method utilized in conjunction with the present invention is the blue noise mask method. The halftone images used in conjunction with the instant application are generated in accordance with the preprocessing steps discussed above, which are also shown in FIG. 7.

It is well known that halftone images require lengthy transmission times in facsimile systems. That is because the halftone images are a "mosaic" of black and white pixels without the redundancy of text and line drawings. The efficient compression of binary halftone images has been studied from different points of view including arithmetic coding (see Langdon and Rissanen, "Compression of Black-White Images," *IEEE Trans. Comm.*, COM-29(6) pp. 858-867, 1981 and Urban "Review of Standards for Electronic Imaging for Facsimile Systems," *Jour. Elect. Imaging*, 1(1) pp. 5-21, 1992). No one method is yet in widespread use, and these are not optimized specifically for high quality halftone reproductions.

SUMMARY AND OBJECTS OF THE INVENTION

In view of the foregoing, it should be apparent that there still exists a need in the art for a method of and apparatus for the inverse of halftone images to produce gray scale images in which a digital data processor is utilized in a simple and precise manner to accomplish an inverse-halftone rendering to provide a gray scale image. Furthermore, there is still a need for simple, efficient encoding for facsimile transmission of halftone images.

More particularly, it is an object of this invention to provide a system for the inverse-halftone rendering of a halftone image which has a simple and reliable mechanism for producing the desired gray scale image.

Still more particularly, it is an object of this invention to provide a system for the inverse-halftone rendering of a halftone image and for the efficient transmission of halftone images.

Briefly described, these and other objects of the invention are accomplished by a system for converting a halftone image to an inverse-halftone image by initially converting the binary image to a gray scale image without adding noticeable blur and while maintaining the dot structure of the halftone image. That is accomplished by applying an adaptive run-length algorithm over the rows and the columns of the halftone image. The results of the application of the adaptive runlengths algorithm over the rows and columns of the halftone image are then averaged and the result is low pass filtered and any impulses remaining in the filtered image are then removed. The gray scale levels near the extremes of the image are then remapped in a dynamic manner, so that the inverse-halftone image or gray scale image has been produced.

In another aspect of the present invention, the blue noise mask disclosed herein can be utilized for the efficient encoding and transmission of information for facsimile communication of halftone images. That is accomplished by encoding the halftone image as a mean gray value of blocks or sub-images as well as a sparse halftone error image and then transmitting those two images in sequence. The halftoning of the image is preferably accomplished with the blue noise mask disclosed herein. A built-in halftone screen, such as the blue noise mask, is stored in both the transmitting and receiving facsimile devices. The gray scale image to be transmitted is then separately halftoned to produce a halftone image and a local mean gray image for each of a predetermined number of sub-regions is calculated. The mean gray blocks are then halftoned using the same halftone screen to create a block mean halftone image. An error image is then created by taking the difference between the halftone image and the mean halftone image. Finally, the mean block level image and the error image are transmitted by the facsimile machine using standard encoding schemes.

At the receiving facsimile, the mean block level image is received and the block mean halftone image is produced. The error image is also received. Using the received error image and the produced halftone image, the desired halftone image is produced by adding the mean halftone image and the error image together. The resulting halftone image is then printed or stored for later use.

The system described above for transmitting and receiving halftone images can also be used for encoding and decoding digital images for either storage or transmission. An image is first compressed or encoded by reducing the gray image to a halftone image, using the blue noise mask. The information necessary for reproducing the halftone image is further reduced so that the produced halftone image can be stored or transmitted. In order to decompress or decode the stored or received information, the halftone image is reproduced using the decoding method described above in connection with the receiving facsimile. Then the inverse halftoning system discussed above is applied to that halftone image to approximately restore the original gray scale image.

DETAILED DESCRIPTION OF THE PREFERRED EMBODIMENT

Figure 1:
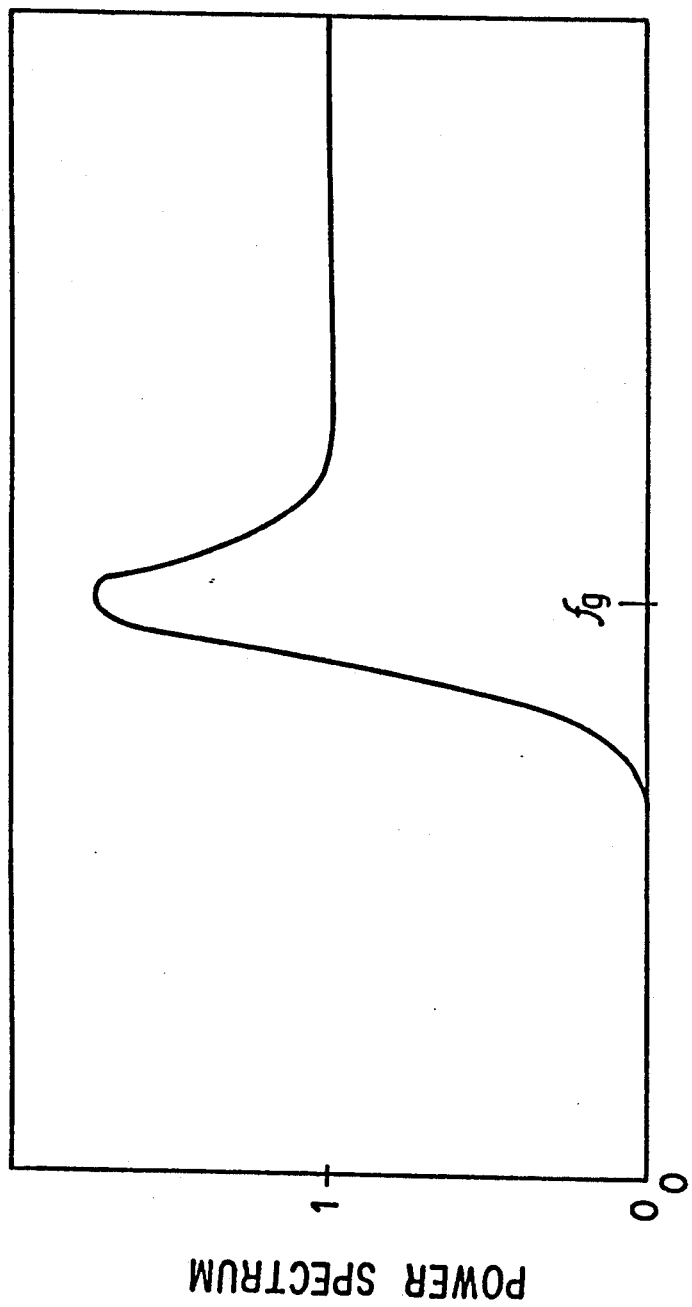
FIG. 1 is a drawing showing the power spectrum of a blue noise pattern formed in accordance with the present invention.

Prior to describing the present invention, the following description of the theoretical underpinnings of the blue noise mask thresholding method is provided.

As described above, the present invention uses a halftone rendering system which accomplishes its function by a pixel-by-pixel comparison of a gray scale image against a "blue noise" mask. As referred to herein, the term "blue noise" is a pattern with negligible low frequency components which possesses certain visually pleasing properties, as described by R. Ulichney in his book, *Digital Halftoning*.

In the present invention, depending upon which pixel is larger, either the gray scale image or the blue noise mask, a 1 or a 0 is placed in the binary (black or white) image file which is the halftone rendered version of the gray scale image. Using the notation that the gray scale image is M×N pixels in size and B-bits of gray per pixel, the blue noise mask can be a smaller array J×K in size where J is less than or equal to M and K is less than or equal to N with only B−1 bits per pixel.

The blue noise mask described herein is constructed to have unique first and second order properties. When thresholded at any level, for example at A% of the maximum level, exactly A out of every 100 pixels will be greater than the threshold value. In addition, the spatial distribution of the pixels above the threshold is arranged in such a manner as to form a blue noise pattern which has been shown to be visually pleasing.

The disclosed blue noise mask, therefore, has the characteristic that the first order statistics are uniformly distributed over gray levels. That is, when the blue noise mask is thresholded at a gray level g, exactly g×100% of all values are below the threshold. For g=0.5, exactly 50% of the blue noise mask pixels are above, and 50% below the threshold value. The blue noise mask disclosed herein also has the characteristic that when thresholded at any level g, the resulting bit pattern has a power spectrum consistent with and approximating the ideal blue noise pattern for that threshold. In addition, since the blue noise image is constructed with explicit "wraparound" properties, a small blue noise pattern of J×K pixels can be used to halftone render a larger M×N pixel's image, because the pixel-by-pixel comparison can proceed modulo J and modulo K in the respective directions, with no apparent discontinuities or obvious periodicities. However, the value of (J×K) should not be smaller than X/2, where X is the number of levels of the original gray scale image.

It is also desirable to describe the digital halftoning system of the present invention for the analog case in which discrete space is replaced by continuous space. Using such notation, x and y represent continuous space, while i and j represent discrete space. Thus, the gray scale image is denoted by f(x,y), the blue noise mask is denoted by m(x,y) and the output (halftoned) binary image is denoted by h(x,y).

Thus, for a B-bit image array f(i,j), the blue noise mask array m(i,j) is a B-bit array such that, when thresholded against f(i,j), up to $2^B$ levels of varying distribution of black and white dots can be represented on a rectangular grid. Note that the dimensions of the blue noise mask can be smaller than those of the gray scale image and that the halftoning of the gray scale image is achieved by a periodic repetition of m(i,j) over the entire image plane. For example, for a 256×256 8-bit class of images, a 128×128 8-bit blue noise mask array can be used.

The binary pattern that results after thresholding the blue noise mask at a constant level g is called the dot profile for that level. The dot profiles are arrays that have the same dimensions as the mask array, and consist of ones and zeros. The ratio of ones to zeros is different for every dot profile and depends on the gray level that particular dot profile represents. In the notation used herein, the higher the gray level, the more ones and less zeros that will be contained in the dot profile. p(i,j,g) is used to denote the value of the dot profile at pixel location (i,j) and for the gray level g. g=0 is used to represent black and g=1 is used to represent white. Thus, 0<g<1. Also, by denoting as $f_{i,j}$ the value of the discrete space function f(i,j) at pixel location (i,j), a N×N binary image h(x,y) can be written as the following in terms of the dot profiles:

$$h(x,y) = \sum_{i=0}^{N/2-1} \sum_{j=0}^{N/2-1} p[m;n;f_{ij}]rect(x - mR)/R \; rect(y - nR)/R \quad (2)$$

where R is the spacing between the addressable points on the display device, and rect(x)=1 if $|x|<\frac{1}{2}$ and rect(x) =0 otherwise. Therefore, for any gray scale image, the corresponding binary image h(x,y) can be constructed as follows in terms of the dot profiles: For every pixel in the gray scale image array f(i,j) that is at the (i,j) location and has a value $f_{i,j}=g$, the corresponding pixel in the binary image array h(i,j) has a value that is given by the value of the g-level dot profile at the (i,j) location.

The dot profiles for every level are designed and combined in such a way as to build a single valued function, the blue noise mask. The blue noise mask is constructed such that when thresholded at any level, the resulting dot profile is a locally aperiodic and isotropic binary pattern with small low-frequency components, which in the halftoning literature, is known as a blue noise pattern. Those dot profiles are not independent of each other, but the dot profile for level $g_1+\Delta g$ is constructed from the dot profile for level $g_1$ by replacing some selected zeros with ones. For example, for a N×N B-bit mask array and maximum pixel value given by $2^B$, $\Delta g$ is given by $\Delta g=\frac{1}{2}^B$ and the number of zeros that will change to ones, in order to go from level $g_1$ to level $g_1\Delta g$ is $N^2/2^B$.

As the dot profile is changed from its pattern at $g_1$ to $g_1+\Delta g$, another array called the cumulative array is incremented in such a way as to keep track of the changes in dot profiles from gray level to gray level. That cumulative array (not a binary array but a B-bit array) becomes the blue noise mask because, when thresholded at any level g, the resulting binary pattern reproduces the dot profile for that level.

Referring now to the figures wherein like reference numerals are used throughout, there is shown in FIG. 1 a diagram of the power spectrum of a blue noise pattern which is free of a low frequency component and is radially symmetric. The absence of low frequency components in the frequency domain corresponds to the absence of disturbing artifacts in the spatial domain. Radial symmetry in the frequency domain corresponds to isotropy in the spatial domain. Isotropy, aperiodicity and the lack of low-frequency artifacts are all desirable properties in halftoning because they lead to visually pleasing patterns.

As shown in FIG. 1, the cutoff frequency $f_g$, which is termed the Principal Frequency, depends as follows on the gray level g:

$$f_g = \begin{cases} \sqrt{g}/R & \text{for } g \leq \frac{1}{2} \\ \sqrt{1-g}/R & \text{for } g > \frac{1}{2} \end{cases} \quad (3)$$

where R, as before, is the distance between addressable points on the display and the gray level g is normalized between 0 and 1. As can be seen from the above equation, $f_g$ achieves its maximum value where $g=\frac{1}{2}$, since at that level the populations of black and white dots are equal and thus very high frequency components appear in the binary image.

Figure 2:
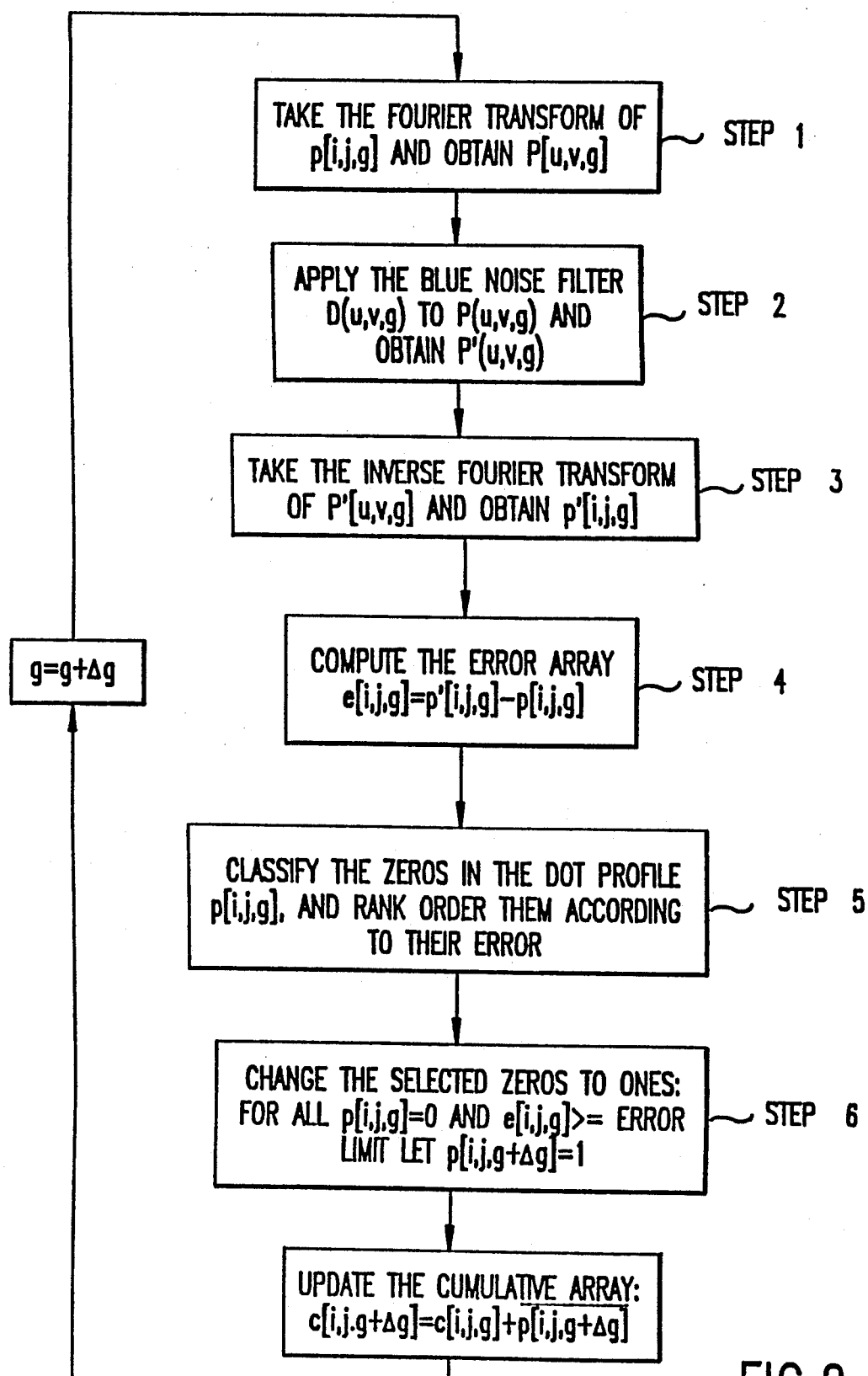
FIG. 2 is diagram of a flow chart for the design of the blue noise mask of the present invention.

For a $N \times N$ Bbit image with $2^B$ as the maximum pixel value, the blue noise mask is constructed as follows: First, the dot profile $p[i,j,\frac{1}{2}]$ that corresponds to the 50% gray level is created. That dot profile is generated from a white noise pattern after filtering it with a high pass circularly symmetric filter and results in a binary pattern having visually annoying low frequency components. In order to give blue noise properties to the $p(i,j,\frac{1}{2}]$ dot profile, the following iteration procedure is utilized, as shown in FIG. 2, which is a flow chart showing the steps for designing a blue noise mask for generating level $g+\Delta g$ from level g.

Step 1. Take the 2-dimensional Fourier transform of the dot profile $p[i,j,\frac{1}{2}]$ and obtain the dot profile $P[u,v,\frac{1}{2}]$, where u and v are the transformed coordinates, and P represents the Fourier Transform.

Step 2. Apply a blue noise filter $D(u,v,\frac{1}{2})$ to the spectrum $P[u,v,\frac{1}{2}]$ and in that way obtain the new spectrum $P'[u,v,\frac{1}{2}] = P[u,v,\frac{1}{2}] \times D(u,v,\frac{1}{2})$ The blue noise filter is designed to produce in the dot profile spectrum $P'[u,v,\frac{1}{2}]$ an average cross section along a radially symmetric line shown in FIG. 1. The principal frequency is given by $f_g = 1\sqrt{2} R$.

Step 3. Take the Inverse Fourier transform of $P'[u,v,\frac{1}{2}]$ and obtain $p'[i,j,\frac{1}{2}]$, which is no longer binary but has much better blue noise properties.

Step 4. Form the difference $e[i,j,\frac{1}{2}] = p'[i,j,\frac{1}{2}] - p[i,j,\frac{1}{2}]$. That difference is referred to as the error array.

Step 5. Classify all pixels into two classes according to the value of $p[i,j,\frac{1}{2}]$ for each pixel; all the zeros belong in the first class and all the ones in the second. Then, rank order all the pixels in those two classes according to the value of $e[i,j,\frac{1}{2}]$ for each pixel.

Step 6. Set a limit, $l_E = E$, for the magnitude of the highest acceptable error. That limit is usually set equal to the average magnitude error. For the zeros, $l_E = E$ and for the ones, $l_E = -E$. Change all the pixels that contain a zero and have an error higher than the defined limit to ones. Similarly, change all the pixels that contain a one and have an error smaller than the defined negative limit to zeros. The number of zeros that are changed to ones must be equal to the number of ones that are changed to zeros so that the total average is preserved. The initialization process is then complete.

The above procedure is then repeated until no pixels have an error higher than some predetermined error. Note that the magnitude of the average error becomes lower for both zeros and ones every time the procedure is repeated.

In order to finish the initialization procedure, refer to another N x N array, which is denoted as $c[i,j,\frac{1}{2}]$ and referred to as the cumulative array, and give a value of $2^{B-1}$ to every pixel whose corresponding pixel in the dot profile has a value of zero, and give a value of $2^{B-1} - 1$ otherwise. In that way, when the cumulative array, which eventually will become the blue noise mask, is thresholded at a 50% gray level, the resulting dot profile is equal to $p[i,j,\frac{1}{2}]$.

After having generated in the above fashion the dot profile for the $\frac{1}{2}$ gray level, the $\frac{1}{2} + g$ gray level is then constructed, where $\Delta g$ is usually taken as $\frac{1}{2}^B$, the quantization limit. In general $\Delta g \geq \frac{1}{2}^B$. The dot profile for the $\frac{1}{2} + \Delta g$ gray level is generated from the dot profile for the $\frac{1}{2}$ level by converting $N^2/2^B$ zeros to ones. The selection of the pixels that contain a zero and will be replaced by a one is done following a procedure similar to the one described previously for the design of the $\frac{1}{2}$ dot profile in FIG. 2.

In general, the dot profile for the $g + \Delta g$ level can be generated from the dot profile for the g level, as shown in FIG. 2. Up to Step 4, the procedure for the creation of the $g + \Delta g$ dot profile is exactly the same as the procedure for the creation of the initial dot profile for the $\frac{1}{2}$ level. It is important to note that in Step 2, the principal frequency of the blue noise filter is updated for every level according to equation (2). After Step 4, the purpose is to go up one gray level and thus only zeros are changed to ones. Using the error array, the pixels that contain a zero are classified in Step 5 and rank ordered, and then $N^2/2^B$ selected zeros are changed to ones in Step 6:

$$\forall p[i,j,g] = 0 \cap e[i,j,g] \geq l_e \rightarrow p[i,j,g + \Delta g] = 1; g \geq \frac{1}{2} \quad (4)$$

Every time a zero is changed to one, the statistics of its neighborhood change and therefore the information contained in the error array for its neighboring pixels may not be valid any more. For that reason, only a few zeros are replaced with ones and then the error array is recalculated or as an additional criteria is checked, such, as neighborhood mean and runlengths. Finally, the cumulative array is updated in Step 7 by adding one only to those pixels that still correspond to a zero in the dot profile $p[i,j,g + \Delta g]$:

$$c[i,j,g + \Delta g] = c[i,j,g] + \overline{p[i,j,g + \Delta g]}; g > \frac{1}{2} \quad (5)$$

where the bar indicates a logical "not" operation changing zeros to ones and vice versa.

In that fashion, when the blue noise mask is thresholded at constant level $g + \Delta g$, the resulting binary pattern is the dot profile $p[i,j,g + \Delta g]$. That procedure is repeated until the dot profiles for all the gray levels from $\frac{1}{2} + \Delta g$ up to 1 are created. The levels from $\frac{1}{2} - \Delta g$ to 0 are created in the same way with the only difference that the ones are changed to zeros and the cumulative array is updated as follows:

$$c[i,j,g - \Delta g] = c[i,j,g] - p[i,j,g - \Delta g]; g < \frac{1}{2} \quad (6)$$

When the process has been implemented for all gray levels g, the cumulative array contains the desired blue noise dot profile for all levels, and is therefore the desired blue noise mask.

Once the blue noise mask has been generated, as described in connection with FIGS. 1 and 2, it can be used in a halftoning process. Since halftoning using a blue noise mask is a point algorithm, it can therefore be implemented either digitally or optically.

Figure 3:
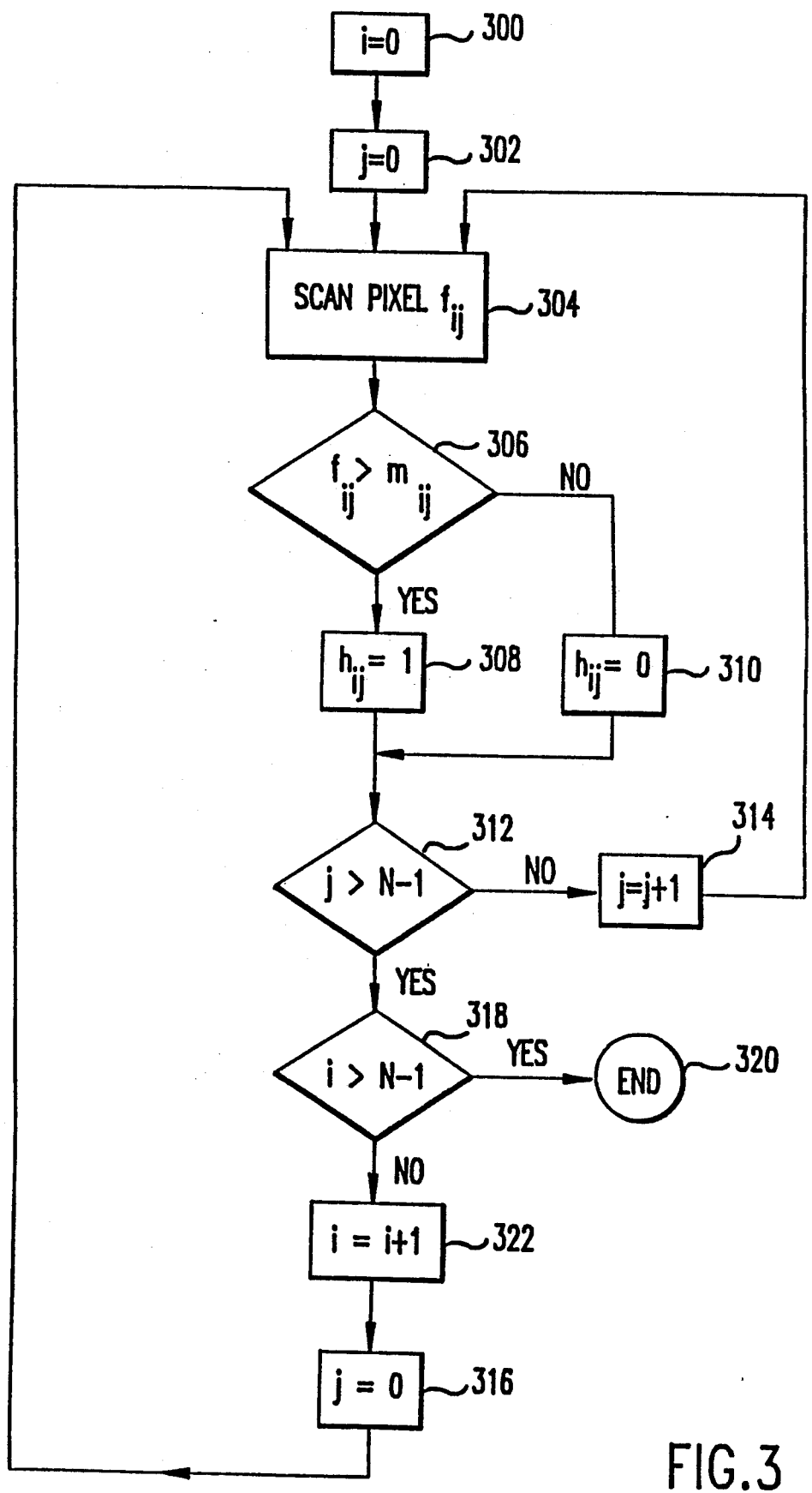
FIG. 3 is a diagram of a flow chart for the digital implementation of halftoning using a blue noise mask in accordance with the present invention.

A flow chart depicting the digital implementation of halftoning using a blue noise mask according to the present invention is shown in FIG. 3. In digital applications such as facsimile machines and laser printers, the instant method requires much less memory and/or computation than do other blue-noise-producing techniques such as error diffusion taught by Ulichney and by Sullivan et al. in U.S. Pat. No. 4,920,501, issued Apr. 24, 1990.

Figure 4:
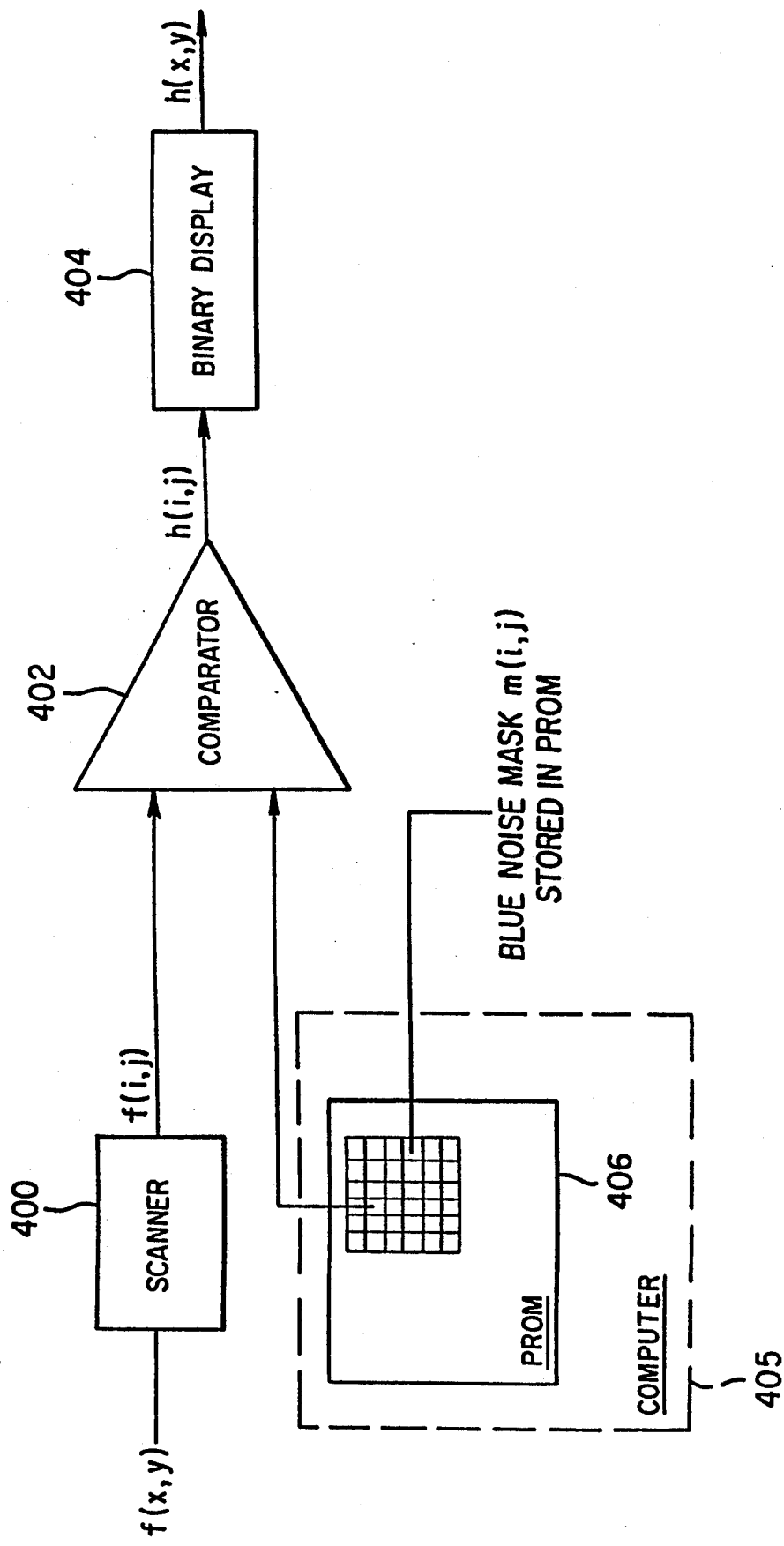
FIG. 4 is a schematic block diagram of a hardware system for digitally implementing halftoning using the blue noise mask in accordance with the present invention.

The necessary memory needed to store the blue noise mask array is stored on a PROM, as shown in FIG. 4. Then, the halftoning of a N×N gray scale image array f(i,j) against the blue noise mask array m(i,j) is implemented as follows: The i and j variables are first set to 0 at steps 300 and 302, respectively. The next pixel $f_{i,j}$ is then scanned at step 304. A determination is made at step 306 to determine if the value of that pixel $f_{i,j}$ is greater than the value of the corresponding element in the blue mask array $m_{i,j}$.

If it is determined at step 306 that the value of the gray scale image array pixel is greater than the value of the blue noise mask array pixel, then the value of the resulting array $h_{i,j}$ is set equal to 0 at step 310.

If an affirmative determination is made at step 306, then the value of the resulting array element $h_{i,j}$ is set equal to 1 at step 308. After steps 308 and 310, a determination is then made at step 312 of whether j is greater than N−1. That indicates the end of a row or column. If a negative determination is made at step 312, then j is set equal to j+1 at step 314 and the program then returns to step 304 to scan the next pixel.

If an affirmative determination is made at step 312, that indicates that the end of the scanned line has been reached. Then, the instant method is applied to the first pixels (j=0) of the next line. A determination is then made at step 318 of whether i is greater than N−1. If an affirmative determination is made at step 318, that indicates that the end of the image has been reached, and the program then ends at 320.

If a negative determination is made at step 318, that indicates that the end of the image may not have been reached and that additional pixels remain. Thus, the next line is scanned. The value of i is then set equal to i+1 at step 322, the value j is set equal to zero at step 316 and then the next pixel is scanned at step 304.

FIG. 4 shows an example of the hardware which may be used for the digital implementation of halftoning using a blue noise mask as discussed in the instant application. It should be understood that the hardware implementation can be either digital or analog, for example, using an operational amplifier in place of the comparator 402 in the analog case. It is a significant advantage of digital halftoning using a blue noise mask that it is much faster than the other known blue noise producing techniques, because the halftoning is done by a simple pixelwise comparison. The digital halftoning using a blue noise mask process of the present invention can be speeded up even further by performing the comparison step in parallel, since all of the thresholds are preassigned.

As shown in FIG. 4, a scanner 400 is used to scan an image and convert the pixels on that image from an array of f(x,y) to the gray scale image array f(i,j). The output from the scanner 400 is fed to a first input of the comparator 402.

As previously described, the blue noise mask array m(i,j) is stored in the PROM 406 which may be located in a computer 405. The output from the PROM 406 is fed to the second input of the comparator 402. The output of the comparator is the binary image array h(i,j) which is fed to a binary display 404 which converts that array into the final image array h(x,y).

As previously discussed, the present halftoning using a blue noise mask invention can also be implemented in an optical or photographic manner. An example of an optical application of the present halftoning system is the photographic process used in newspaper printing. Such a process can be either multiplicative or additive.

Figure 5:
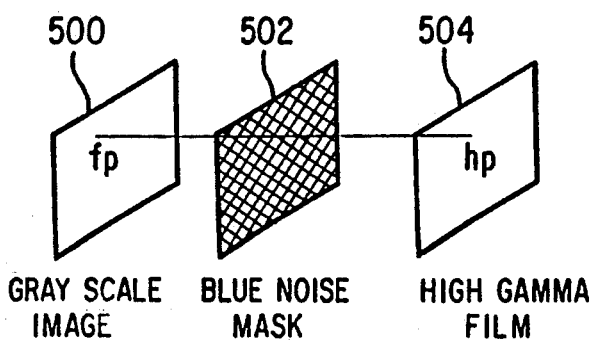
FIG. 5 is a drawing of a multiplicative photographic process utilized for optically implementing halftoning using a blue noise mask in accordance with the present invention.

In the multiplicative photographic process, the gray scale image f(x,y) 500 is photographed through the blue noise mask 502 which has a transmittance m(x,y) and the resultant superposition h(x,y)=f(x,y)×m(x,y) is printed onto high contrast film 504, such as high gamma film. That procedure is shown in FIG. 5. It should be understood that a point $f_p$ in the array f(x,y) corresponds to a dot $h_p$ in the array h(x,y), whose size and shape depends on the gray level that $f_p$ represents.

Figure 6:
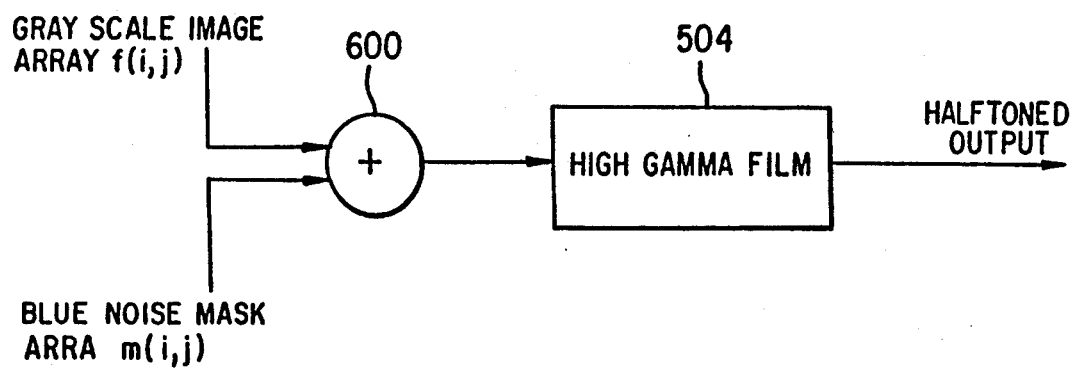
FIG. 6 is a drawing of an additive photographic process which may be utilized in the optical implementation of halftoning using a blue noise mask in connection with the process shown in FIG. 5.

FIG. 6 shows the additive photographic process in which the blue noise mask is added to the gray scale image at the film plane by a double exposure. The gray scale image array and blue noise mask array are added by adder 600 and then fed to the high gamma film 504 which produces the halftoned output. The adder 600 is in simplest form a repeated exposure of the film 504, where the image and the blue noise mask are exposed separately onto the film 504, which is then developed.

In general, a gray scale photographic blue noise mask m(x,y) can be obtained from a calculated array m(i,j) using a film printer such as a matrix camera interfaced to a PROM or a computer. The conversion from discrete points to a continuous image is then given by equation (1). Print film or transparency film is exposed by the computer controlled film printer so as to produce a photographic blue noise mask.

The blue noise mask can also be used for halftoning in applications that involve multibit and color displays. The digital halftoning process for a binary display using a blue noise mask (FIG. 2) can also be expressed as follows:

$$h(i,j) = int\{m(i,j) + f(i,j)\} \tag{7}$$

wherein int denotes integer truncation and the gray levels of m(i,j) and f(i,j) vary between 0 and 1. In general, for a K-bit display, the output image array h(i,j) can be written as follows:

$$h_K(i,j) = \frac{1}{2^K - 1} int\{(2^K - 1)m(i,j) + f(i,j)\} \tag{8}$$

The $2^K - 1$ threshold values are equally spaced between 0 and 1. A non-uniform quantizer is also possible.

The instant method can also be applied to color halftoning, by independently thresholding each one of the component colors against the blue noise mask and then overprinting.

In the process of inverse-halftoning, there are two categories for reconstructing a gray scale image from a halftone image. The first category involves cases where the information available is limited to the information contained within the halftone image. This category includes halftone methods which do not use a mask or halftone kernel, such as error diffusion, and images for which the exact halftone mask used is uncertain. The second category is comprised of instances where the halftone kernel is either known or can be determined. That includes identifiable ordered dither halftone methods and blue noise mask methods. Further, when the halftone kernel is known, additional constraints can be obtained for use in reconstructing the gray levels. We consider both cases, whereas only the latter case has been treated in the prior art.

The second category of inverse-halftoning methods is used in those situations in which additional information can be obtained from a knowledge of the halftone mask. Netravali and Bowen, in their paper "Display of Dithered Images" *Proceedings of the SID*, described earlier, first pointed out that a gray level image could be approximated from its dithered image using information supplied by the halftone matrix. When a halftone mask is known, the range of possible gray values for the estimated gray level is reduced. That leads to an improved estimation of the gray scale image over the method described by Netravali and Bowen.

Single pixel estimates of the gray scale image can be derived from single pixels of the binary image when the halftone mask $h(i,j)$ is known. That is because the basic decision rule for halftoning is stated as $$b(i,j) = \begin{cases} 1 \text{ if } g(i,j) > h(i,j) \\ 0 \text{ if } g(i,j) \leq h(i,j) \end{cases} \quad (9)$$

Thus, the single pixel estimate (with h normalized, 0 is < than h is < than 1) is described by $$g'(i,j) \rightarrow \begin{cases} h(i,j) < g' < 1 & \text{if } b(i,j) = 1 \\ 0 < g' < h(i,j) & \text{if } b(i,j) = 0 \end{cases} \quad (10)$$

where the estimate is taken to be the expected value of the given range. Since the precision of any estimate is linked to the range of numbers associated with that pixel, that is, if $b(i,j)$ is 1 and $h(i,j)$ is 0.6, then the range of possible values of $g'(i,j)$ is between 0.6 and 1.0. However, that is an undesirably large range. That large range can be limited, however, using a method which combines different estimates.

Since a single pixel estimate is a point operation, no additional blurring associated with neighborhood operations is introduced into the reconstructed gray image. The information obtained in performing the single pixel operation is not limited to the estimated pixel values, $g'(i,j)$. Two additional constraints may also be used which will aid in further processing the image. The first of such constraints is a "goodness" or weight value, which distinguishes good estimates from poor estimates. This value can be assigned to each estimated pixel. For $g(i,j)$ approaching 0 and $g(i,j)$ approaching 1, the weight value increases as $$\begin{cases} \forall b(i,j) = 1 \cap h(i,j) \rightarrow 1.0 \\ \forall b(i,j) = 0 \cap h(i,j) \rightarrow 0.0 \end{cases} \rightarrow (w \rightarrow 1) \quad (11)$$

and decreases as $$\begin{cases} \forall b(i,j) = 1 \cap h(i,j) \rightarrow 0.0 \\ \forall b(i,j) = 0 \cap h(i,j) \rightarrow 1.0 \end{cases} \rightarrow (w \rightarrow 0) \quad (12)$$

This information can be used to approximate the degree by which a pixel value is in error, and by how much its value should be adjusted.

The second constraint is range information which is available for each estimated pixel. This constraint can be used to set boundaries, thus keeping a pixel from taking on impossible values when further processing is performed. This constraint is set out in $$\begin{aligned} \forall b(i,j) = 1 \rightarrow r = [h(i,j),(L-1)] \\ \forall b(i,j) = 0 \rightarrow r = [0,h(i,j)] \end{aligned} \quad (13)$$

When two or more pixels of the binary image are used in conjunction with the corresponding pixels of the halftone mask, great increases in the precision of the gray scale image estimate can be obtained. Thus, assuming that the image is slowly varying in a Region R, and $b(i,j)$ are 1, the result is $$\forall b(i,j)_{ER} = 1 \rightarrow \max\{h(i,j)_{Er}\} \leq g' \leq 1 \quad (14)$$

Analogous rules can be derived for the case where $b(i,j)$ are 0:

$$\forall b(i,j)_{ER} = 0 \rightarrow 0 \leq g' \leq \min\{h(i,j)_{eR} \quad (15)$$

For mixed results, where the value of b's are 0 and 1 within a neighborhood, the result is $$\begin{aligned} \forall b (i,j)_{\epsilon R} = 1 \rightarrow x_1 = \max(h (i,j)_{\epsilon R}) \\ \forall b (i,j)_{\epsilon R} = 0 \rightarrow x_0 = \min\{h (i,j)_{\epsilon R}\} \\ \min(x_0,x_1) \leq g' \leq \max(x_0,x_1) \end{aligned} \quad (16)$$

providing new minimum and maximum bounds on g'.

Although neighborhood operations imply some form of low pass filtering, the neighborhood operations associated with the halftone mask constraints can be smaller than those associated with a "smoothing" operation on the binary pattern alone. As the number of pixels used increases, the expected values of g' more closely approach the original gray level, and the dynamic range is less compressed. Thus, the blue noise mask will be superior to conventional screen halftones. In the blue noise mask, adjacent pixels are highly uncorrelated. Conversely, in conventional masks, there is a great degree of correlation between neighboring pixels and, therefore, the region size required to gain independent information is increased. No such increase is required when the blue noise mask is utilized to produce the halftone.

Information introduced using neighborhood operations with the blue noise mask may be summarized as follows.

1. Because neighborhood operations imply low pass filtering, some degree of image blurring occurs, the amount of which is dependent upon the size of the neighborhood.

2. Range compression is greatly reduced, thus the original range of gray scale values is more closely preserved.

3. "Goodness", or weight criteria, and range information can no longer be applied with certainty as in the single pixel case. That is because an estimated value is no longer associated with a given pixel, but rather with the statistics of the neighboring pixels. Using single pixels or neighborhoods and the blue noise mask to form a reconstructed gray scale image results in a compression of the gray scale of the resulting image. Most all gray levels will still be present in a reconstruction, however, the local mean will be compressed. For example, for a 1 pixel operation, a linear 50% compression can occur. For estimates which use neighborhoods, the dynamic range would expand as the number of pixels included in the neighborhood increases.

Figure 8:
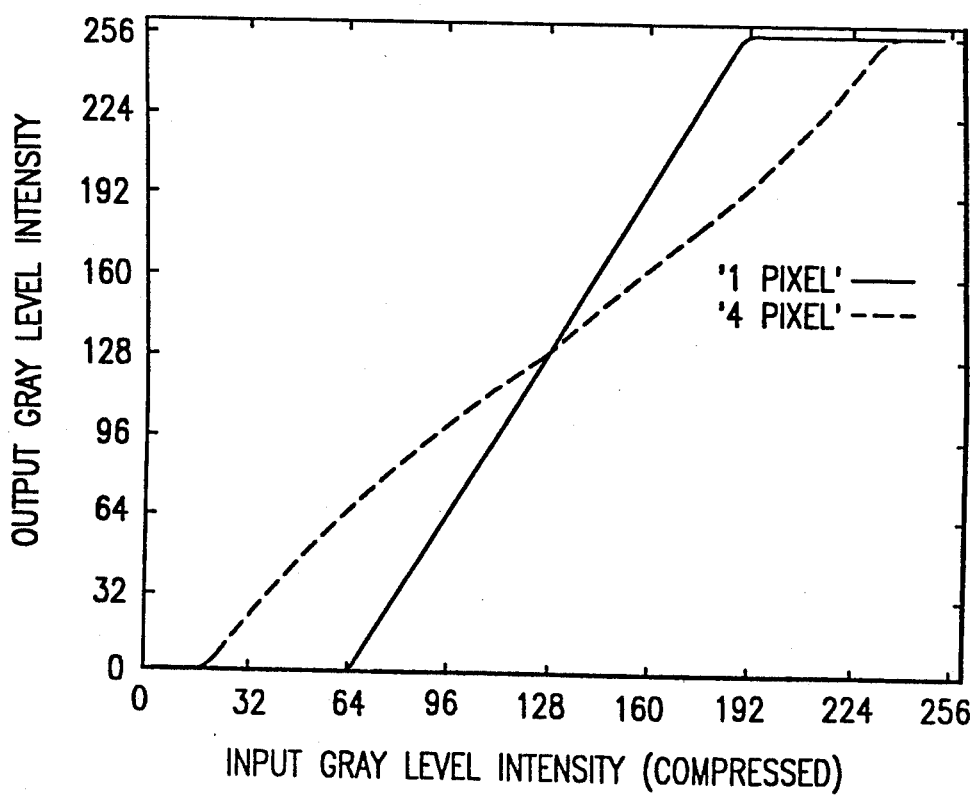
FIG. 8 is a diagram showing the curves for expanding 1 and 4 pixel reconstructions, using the blue noise mask in accordance with the present invention, to include the full range of gray levels.

FIG. 8 shows the mappings attributed to a single pixel and four pixel neighborhood reconstructions. The input gray level estimates are remapped to the vertical axis so as to utilize the entire gray scale $(0, L-1)$. For those noisy estimates, the results of remapping are not ideal. Therefore, further processing should be performed in order to achieve the greatest benefits of the instant inverse-halftoning method.

While it is true that, as shown in FIG. 8, the total number of gray levels is reduced, it is well known in image processing that the human eye sensitivity requires only 6-bits or 127 gray levels in order to simulate continuous shading and avoid contouring. The 1 pixel operation meets this criteria. Therefore, if the mask is known, the 1 pixel construction is a significant improvement over prior methods. No additional blurring is added and a better approximation to the gray scale is achieved. Several techniques which use these results to further minimize the error in the estimated image can also be utilized, such as optimal frequency domain filtering.

While each of the methods previously discussed produces unique reconstructions of the gray scale image from a halftone image, some of those methods perform better in terms of visual perception while others perform better in terms of other standards. However, in many cases, the differences are subjective and no one method stands out as clearly better than the other. However, by combining different methods of reconstruction, the "strong" features of one method of reconstruction will cancel out the "weaknesses" associated with another.

As can be seen from the preceding discussion, a number of primary estimates of g′ and post-processed estimates g″ can be generated. That is true even for the case of the unknown halftone mask, in which estimates can be based on local window neighborhoods, and run lengths of 1s and 0s. However, when the halftone mask is known, additional estimates can be made, which can be modeled as the true image plus zero mean white noise. Independent estimates will have independent error or noise. Using simple arithmetic means of different estimates, we have the result that:

$$\widehat{g_{final}} = \frac{1}{k} \sum_{i=1}^{k} \widehat{g_i} \quad (17)$$

Assuming independent estimates, the final variance of this noise will be 1/k the variance of the noise in any one estimate. However, not all estimates can be considered independent. Therefore, the independence between reconstructions is assumed to be viable because some techniques are based upon single pixel operations, some on fixed local neighborhoods and others on different adaptive run lengths.

A second method of combining information, and the preferred method for the inverse-halftoning inventive method described in this application, is to cascade several of the different algorithms previously discussed into one sequential algorithm. This method is based upon the theory that each algorithm is sequenced such that it makes greater use of the information left by the previous stage, therefore producing an improved result. In that manner, more emphasis is placed on the beneficial attributes of each technique, thus reducing the effects of the weaknesses exhibited by each method.

Figure 9:
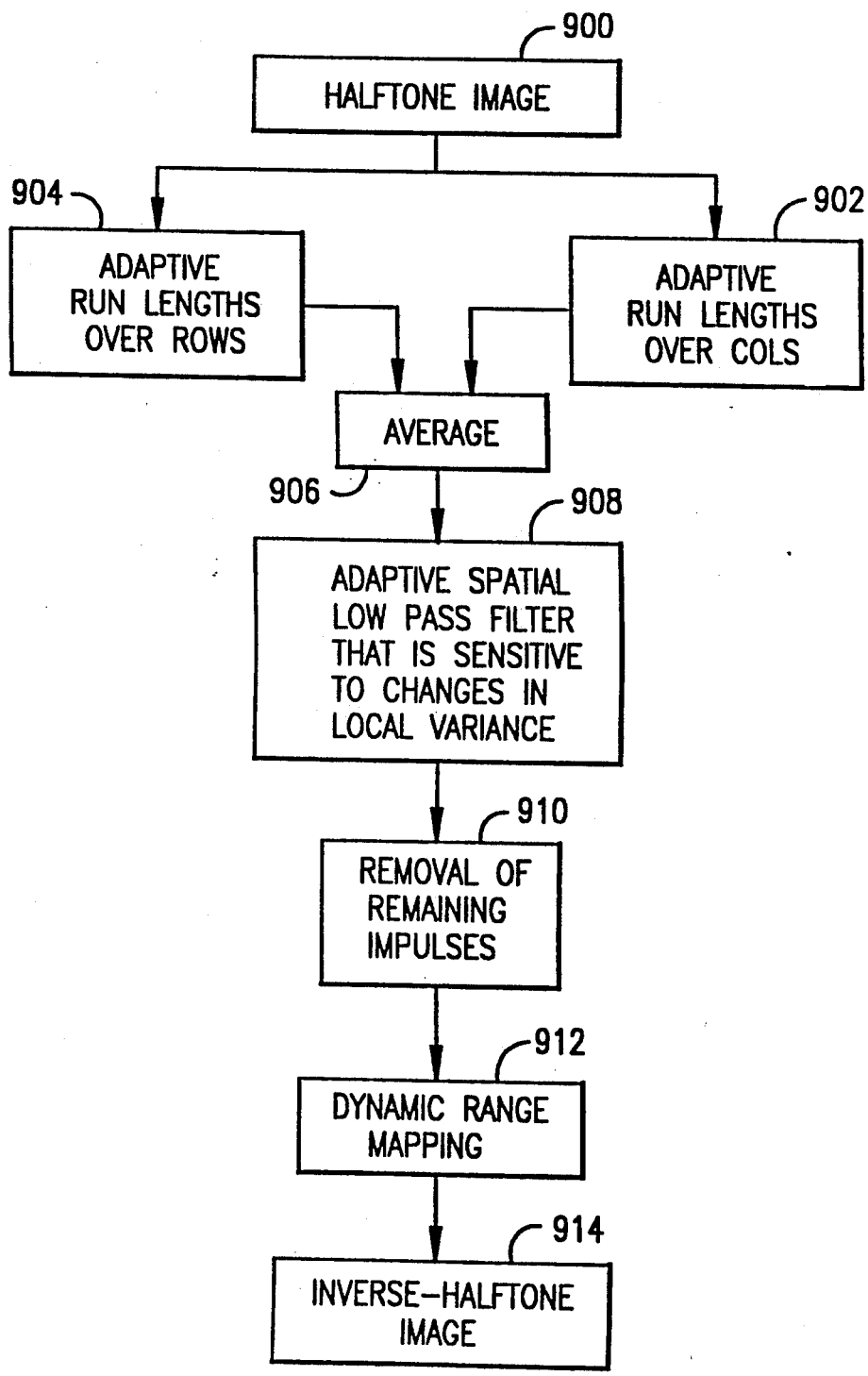
FIG. 9 is a diagram of a flow chart for obtaining an inverse-halftone image from a halftone image in accordance with the present invention.

A three-step sequence which produces visual results superior to the results of any one of the algorithms discussed is utilized. That sequence of operations is shown in block diagram form in FIG. 9 and is described below. The sequence of operations as shown in FIG. 9 can be applied to images halftoned by most dispersed dot halftone methods, and works particularly well for blue noise mask and error diffusion techniques and can also be used for clustered dot halftone images. This sequence requires that no information about the halftone mask or method be needed.

Figure 7:
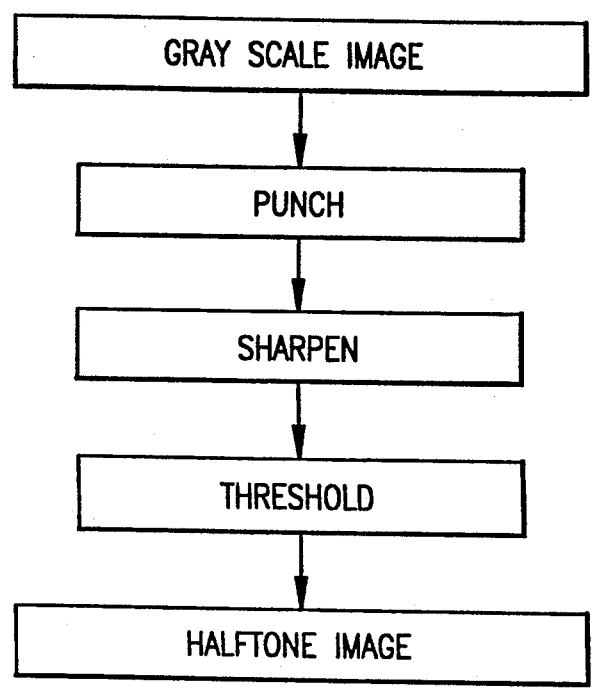
FIG. 7 is a diagram of a flow chart for the preprocessing steps which are performed on a gray scale image in order to convert it to a halftone image.

Beginning with a halftone image 900, produced as previously described in conjunction with FIG. 7, an adaptive run-length algorithm is applied over the rows 904 as well as over the columns of the halftone image 902. The adaptive run-length algorithms are each applied to the entire unaltered halftone image, one over the rows and one over the columns. The use of adaptive run-lengths over the rows and columns is given as follows:

$$\forall b\ (i,j)\epsilon R = 0 \quad (18)$$
$$\rightarrow g'(i,j)\{\epsilon R = \frac{1}{T+1}$$

For rows, $R = (i, j + T)$ $$\forall b\ (i,j)\epsilon R = 1$$

For cols, $R = (i, i + T)$ $$\rightarrow g'\ (i,j)\epsilon R = \frac{T}{T+1}$$

The use of such adaptive run-length algorithms produces an initial conversion of binary to gray scale without adding noticeable blur. The adaptive run-length algorithm can easily be extended to be more intelligent. For example, it can "look ahead" to the next string of ones or zeros in order to determine if the pattern is repeating (or approximately repeating). If yes, the estimate can extend over the entire region. Similarly, the one-dimensional row and column processing for run-lengths can be extended to a two-dimensional filter and to run-lengths along different directions, such as diagonals. Note that the adaptive run-length filter is useful without knowledge of the halftone screen, as was required in the prior art. The introduction of this gray scale information, with minimal blurring, provides an increased capacity for edge detection, which is then utilized by the second stage, a second smoothing stage, using a local statistical based smoothing algorithm. Since edges are more easily detected, the smoothing operators yield better results than through just the use of the adaptive run-length algorithm.

The results of the adaptive run-lengths algorithm applications over the rows and columns is averaged at step 906 and then, is applied at step 908 to an adaptive spatial low pass filter that is sensitive to changes in local variance. A typical additive noise filter which may be utilized for step 908 is the filter disclosed by Lee, in his article "Digital Image Enhancement and Noise Filtering by Use of Local Statistics," *IEEE Transactions on Pattern Analysis and Machine Intelligence*, Vol. PAMI-2, No. 2, pp. 165–168, Mar. 1980. Lee's additive noise filter is used with a 5×5 kernel and K is set at 800. This filter produces a resulting gray scale image according to the following equation:

$$g''(i,j) = \mu + \left(\frac{\sigma^2}{\sigma^2 + K}\right)(g'(i,j) - \mu) \quad (19)$$

kernel = 5 × 5, K = 800

Using a 5×5 kernel and K set at 800, an acceptable degree of smoothing occurs throughout the gray scale image. That is, the filtered gray scale image does not contain artifacts, such as splotching or blurring, associated with low pass operations.

After the completion of step 908, the resulting filtered image is optionally applied to an impulse remover. Thus, at step 910, the remaining impulses are removed. A preferred impulse remover which may be utilized for step 910 is an iterative algorithm as shown in $$\forall \sigma^2 \leq \text{MAXVAR} \cap (g''(i,j) + \beta < \mu)$$
$$\rightarrow g'''(i,j) = g''(i,j) + \beta$$
$$\forall \sigma^2 \leq \text{MAXVAR} \cap (g''(i,j) - \beta > \mu) \quad (20)$$
$$\rightarrow g'''(i,j) = g''(i,j) - \beta$$
$$\beta = 30, 40, 50, 60$$

The gray scale image may be passed through the impulse remover only once. The purpose of utilizing the impulse remover is to locate and make relative adjustments to any pixels that are not associated with edges and which deviate strongly (+ or −30 or greater) from the expected value of the neighborhood. Typically, only a small percentage, such as fewer than 2.0%, of the pixels are modified.

For cases where a periodic, clustered dot halftone image has been inverse-halftoned, the output of step 908 will have periodic patterns instead of impulses. These periodic patterns are related to the halftone screen kernel, and step 910 can be modified to eliminate periodic patterns as well as impulses. This can be done by conventional means such as a frequency selective filter, or by generalizing equation 20 to include clusters.

After the removal of the remaining impulses or periodic patterns at step 910, the gray scale levels near the extremes are still not accurately reproduced. Reproducing such extreme gray scale levels would require unusually long run-lengths. For an arbitrary number of consecutive black pixels, for example 10, the region may be associated with a small area of the image that is solid black (g=0), but the limited area run-length quantizes the pixels to 1/(10+1), or g'=23. Therefore, in step 912, pixels near the extremes (0 and 255) are remapped using a simple exponential shift towards those extremes in a manner similar to the input-output curves of FIG. 8. After the dynamic range mapping step 912, the inverse-halftone image or gray scale image 914 has been produced.

The sequence of steps shown in FIG. 9 can be modified to include the use of the mask information, if it is available. For example, at steps 902 and 904, the adaptive run-lengths can be modified so that the decision shown in equation 21 is used.

$$\forall b(i,j) = 0 \rightarrow \min(g_b', g_m')$$
$$\forall b(i,j) = 1 \rightarrow \max(g_b', g_m') \quad (21)$$

where $g'_b$ represents the quantized run-length and $g'_m$ represents a value derived using the same run-lengths compared to the mask data. However, results based on such knowledge have not been found to be significantly better than those achieved without knowledge of the mask. Further, it is obviously advantageous to be able to reconstruct the gray scale image from the halftone image without knowledge of the mask utilized to convert the gray scale to the halftone image. Thus, halftone images generated using error diffusion techniques, which do not use a mask, are reconstructible using the present invention. Also, the inclusion of mask information can lead to beating and aliasing problems if the mask is not properly realigned to the position of the original halftone screen.

Using the instant inverse-halftoning method which renders a gray scale image from a binary image, it is not possible to reconstruct the exact gray scale image because the forward process of halftoning is a lossy process. However, realistic goals for inverse-halftoning are achieved which result in the rendering of a gray scale image in which the edge and flat image regions are accurately reproduced and free of obvious artifacts. A "softer" and more natural looking image which provides smooth transitions between gray levels while minimizing the introduction of artifacts such as blurring and blotching is produced using the instant invention.

The blue noise mask disclosed herein as well as other halftone screens, can be utilized for the efficient encoding and transmission of information for facsimile communication of halftone images. While other halftone screens can be used for such purposes, it is preferable that the blue noise mask halftone described herein be utilized for such communications. As previously discussed, the blue noise mask is a halftone screen that produces a visually appealing dispersed dot pattern with an unstructured, isotropic pattern. In order to use the blue noise mask halftone screen for the encoding and transmission of information by facsimile communication, both the transmitting and receiving facsimile devices have stored in their memory the same halftone screen. In that manner, as described later, the problem of halftone image encoding can be reduced to that of transmitting the mean gray value of blocks, or sub-images, followed by a sparse halftone error image with increased redundancy and run-lengths compared to the original halftone. In that manner, image entropy is reduced and typical run-lengths can increase by a factor of up to 5. That produces an increase in image quality, combined with increased transmission speed, which adds considerably to the utilization and acceptance of halftone fax images.

As is well known, the efficient transmission of fax data takes advantage of the redundancy of printed text. Long run-lengths of black or white pixels are represented using "Modified Huffman" and "Modified Read" codes, and line-to-line redundancy is further used to reduce the number of bits per page required to reconstruct the facsimile. Redundancy-reduction coding is standardized by the CCITT, which sets forth standard coding schemes for use in Group 3 and Group 4 facsimile equipment. The CCITT facsimile coding scheme uses a 2-dimensional line-byline coding method in which the position of each changing element on the current coding line is coded with respect to the position of a corresponding reference element situated on the reference line located immediately above the coding line. After the coding line has been coded, it becomes the reference line for the next coding line.

However, difficulty arises with this coding scheme when gray scale images, instead of text, are scanned. Since most facsimile printers are capable of only black and white output, the image must first be halftoned. The halftone image is typically composed of a mosaic of dispersed black and white pixels, and is thus not well suited for the conventional redundancy-reduction coding.

Although many different halftoning techniques exist, the most visually pleasing of these produce a fine dispersed, unstructured, isotropic pattern of black and white pixels known as "blue noise." Until recently, the blue noise pattern was produced by a family of algorithms, known as "error diffusion" algorithms, which have the disadvantage that each new image requires new computations to render the halftone pattern. However, the blue noise mask disclosed herein is a halftone screen and not an algorithm, and therefore can be used to rapidly render a halftone having the desired dispersed dot, unstructured pattern of black and white pixels. Because a fixed, unique halftone screen exists and can be restored and reproduced in the transmitting and receiving facsimile machines, the blue noise mask can be utilized as an effective encoder and decoder of images.

Figure 10:
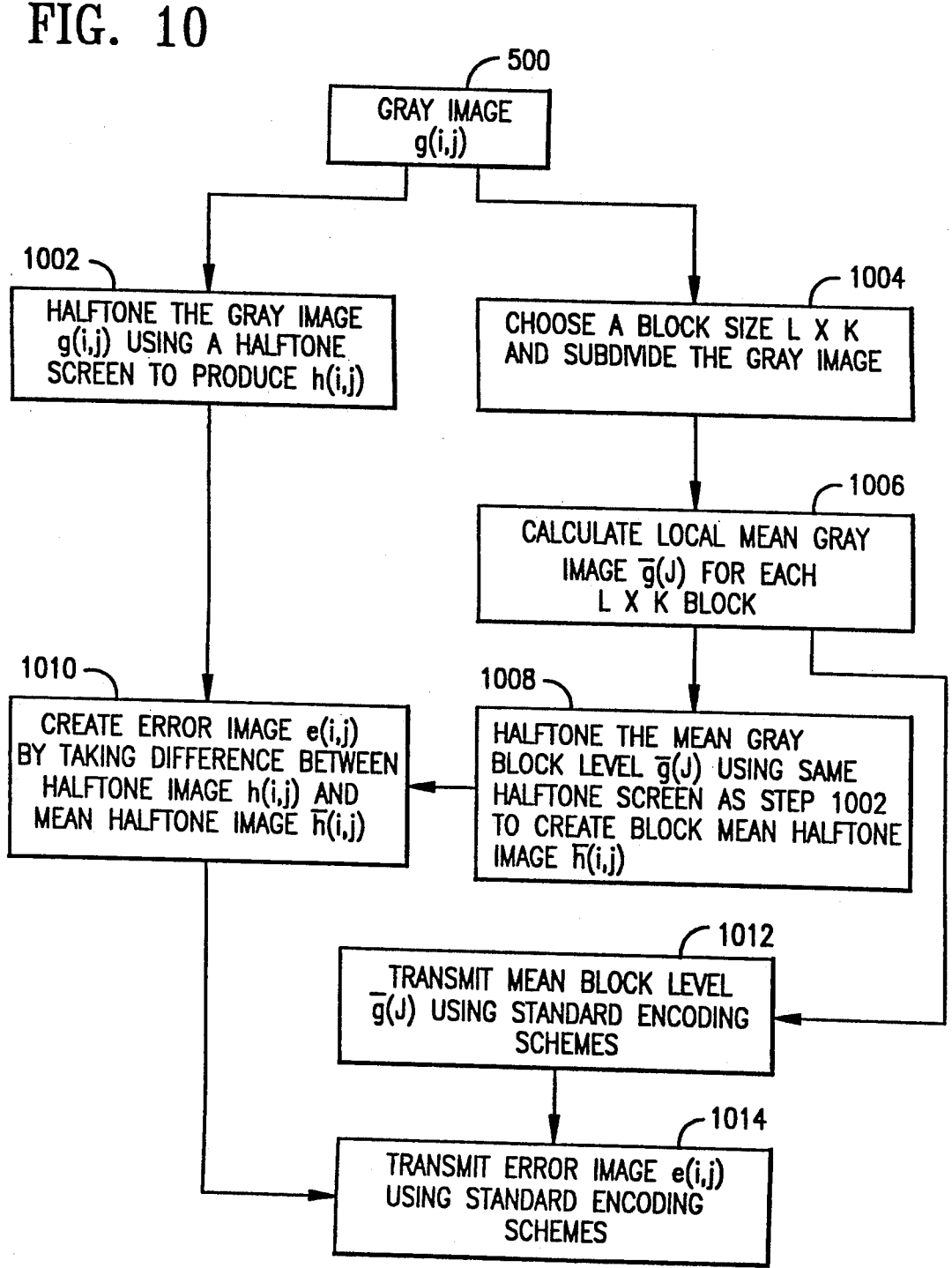
FIG. 10 is a diagram of a flow chart for transmitting a gray image using the halftoning method in accordance with the present invention.
Figure 11:
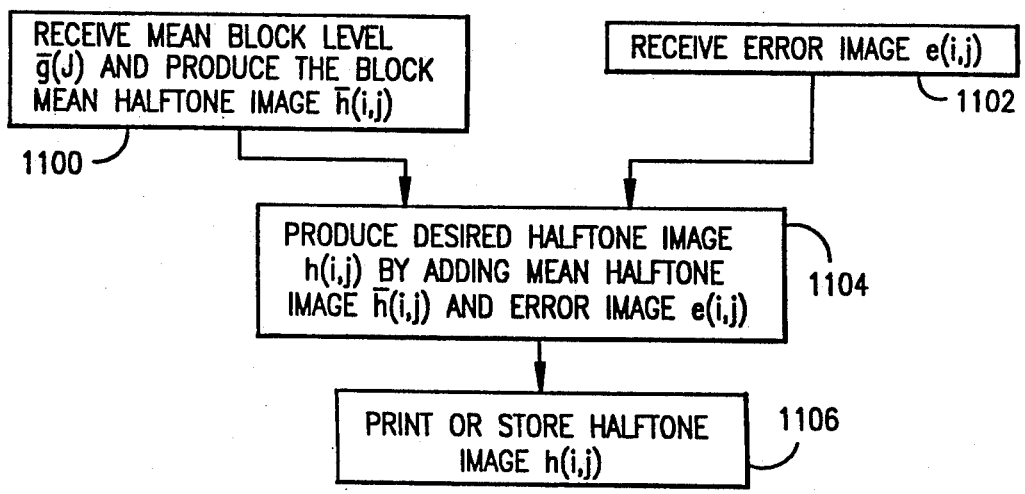
FIG. 11 is a diagram of a flow chart for receiving the gray image transmitted using the steps shown in FIG. 10 and for producing the desired halftone image produced from the gray image of FIG. 10.

The instant method of using a built-in halftone screen, such as the blue noise mask, is shown for the transmitting facsimile device in FIG. 10 and for the receiving facsimile device in FIG. 11. It should also be understood that the Bayer's and Clustered Dot screens may also be utilized. It is also assumed that a gray scale image has been digitized to $M \times N$ pixels at B bits per pixel. It should also be pointed out that the system shown in FIGS. 10 and 11 and as is described herein also produces sharp text transmissions of facsimile text.

As shown in FIG. 10, the system begins with a gray scale image $g(i,j)$ 500. At step 1002, the gray scale image is halftoned using both multi-bit and $M \times N$ arrays of the halftone screen $b(i,j)$ that may be accomplished using the comparison rule of equation 22 to produce the halftone image $h(i,j)$.

$$\forall g(i,j) \geq b(i,j) \rightarrow h(i,j) = 1(\text{white}); \quad (22)$$
$$\forall g(i,j) < b(i,j) \rightarrow h(i,j) = 0(\text{black});$$

Next, as shown at step 1004, a block size $L \times K$ smaller than the $M \times N$ array of the blue noise mask is chosen to subdivide the gray scale image $g(i,j)$. The local mean gray image $\bar{g}(J)$ for each $L \times K$ sub-region or block is then calculated in accordance with equation 23 as follows:

$$\bar{g}(J) = \frac{1}{L \times K} \sum_{i=1}^{L} \sum_{j=1}^{K} g(i,j) \quad (23)$$

ps where the summation is taken to be over the $J^{th}$ sub-region. The optimal size of the sub-region $L \times K$ can be determined empirically based upon the total time required to perform the two transmission steps 1012 and 1014 shown in FIG. 10. The optimal size can also be empirically determined based upon a consideration of the power spectrum or correlation length of the image. Also, the median operator can be used instead of the mean, with some further improvement in the error image but at the expense of a greater required computation for step 1006.

Next, at step 1008, the halftone image of the mean block level $\bar{g}(J)$ is created, using the same halftone screen used in step 1002.

$$\forall_{i,j \in J}: \quad \bar{g}(J) \geq b(i,j) \rightarrow \bar{h}(i,j) = 1 \quad (24)$$
$$\bar{g}(J) < b(i,j) \rightarrow \bar{h}(i,j) = 0$$

As shown in equation 24, the halftone image of the mean block level is a "blocky" halftone image $\bar{h}(i,j)$ which effectively captures the halftone image of the low frequency components of the image. A receiver having the same halftone screen stored in its ROM or other memory can rapidly reconstruct that block mean halftone image $\bar{h}(i,j)$, by receiving the mean gray block level $\bar{g}(J)$ in a prearranged order.

Then, at step 1010, the error image $e(i,j)$ is created. The error image is the difference between the desired halftone image $h(i,j)$ and the block mean halftone image $\bar{h}(i,j)$ and is calculated as follows:

$$e(i,j) = [\bar{h}(i,j) - h(i,j)] \mod 2 \quad (25)$$

It should be noted that the smaller the block size $L \times K$, the sparser the error image will be. Conversely, extra time is required to transmit the mean values of those additional blocks. Although the error image $e(i,j)$ can be either a $+1$, 0 or a $-1$, only two states, 1 and 0, are necessary to represent "error" and "non-error" states between the two binary images. That can be accomplished by taking the modulo 2 of the difference between the block mean halftone image and the desired halftone image. Thus, the desired image $h(i,j)$ can be reconstructed from the mean values $\bar{g}(j)$ and $e(i,j)$ at the receiving facsimile.

As shown in step 1012, the transmitting facsimile machine then transmits the mean block level $\bar{g}(i)$ in sequence. There are $(N \times M)/(K \times L)$ blocks, since i runs from 1 to $(N \times M)/(K \times L)$ and those mean values (B-bits per block) can be encoded in any standard manner.

The final step in the transmission of the halftone image information is shown in step 1014. In that step, the error image $e(i,j)$ is transmitted by the transmitting facsimile machine to the receiving facsimile machine. Since that error is sparse, it is more efficient for standard CCITT encoding schemes.

FIG. 11 shows the system utilized by a receiving facsimile machine to receive the mean block level and the error image transmitted as described from a transmitting facsimile machine. As shown as step 1100, the receiving facsimile machine first receives the mean block level $\bar{g}(j)$ and produces the block mean halftone image $\bar{h}(i,j)$ as follows:

$$\forall_{i,j \in J}: \quad \bar{g}(J) \geq b(i,j) \rightarrow \bar{h}(i,j) = 1 \quad (26)$$
$$\bar{g}(J) < b(i,j) \rightarrow \bar{h}(i,j) = 0$$

At step 1102, the receiving facsimile receives the error image $e(i,j)$. As shown in step 1104, the desired halftone image $h(i,j)$ is produced by adding the mean halftone image $\bar{h}(i,i)$ and the error image $e(i,j)$ and taking the modulo 2 result of the addition. After the desired halftone image $h(i,j)$ has been so produced, it can be printed by the receiving facsimile machine or stored in that facsimile machine's memory for later use, both in a conventional manner.

It should be noted that transmission steps, along with scanning and receiver steps, can also be performed concurrently so that a minimal amount of time is required in order to send a picture by facsimile from one fax machine to another. The foregoing system for the compression, transmission and decompression of halftone images can be used to produce an unstructured and visually pleasing dispersed dot pattern image at the receiving facsimile machine. Compared to the transmission of typically "busy" halftone images, the use of the instant invention reduces entropy and increases the average run-lengths by a factor of 4-5. Thus, efficient transmission using conventional CCITT techniques can be realized, with an increase in the speed and quality of halftones transmitted by facsimile machines, as compared to results currently obtainable in the art.

The method disclosed in FIGS. 10 and 11 can also be utilized for encoding and decoding digital images for either storage or transmission. For example, it is a common problem in dealing with digital images that too many bits of data are required for the efficient storage or transmission of such images. For example, in order to digitize a quality continuous tone image to 1K×1K pixels, at 8-bits per pixel, one million bytes of information are required for the storage or transmission of such digital image. In order to save on storage and transmission losses, a number of encoding schemes have been developed. All of these schemes try to minimize the information required to specify the original image, for example, by exploiting redundancy present in the image. The present system makes use of the fact that a so-called "lossy" method for encoding the digital image can be utilized to produce an acceptable image.

A lossy image is one in which the image is only approximately recovered, as opposed to the exact recovery of an image from an encoded version, which is called "lossless". Since the human eye does not perceive small losses or degradations in the image generated from the encoded and decoded image, such lossy methods are acceptable for common use. An example of a known encoding method which in usual practice is lossy is that of the international standards group known as the Joint Photographic Expert Group (JPEG). Using the JPEG standard, the amount of information necessary to transmit an encoded digital image can be reduced by a factor of 10 or greater, thus enabling quick transmission of the encoded image by phone lines, or allowing a reduction in the memory required to store the encoded image. However, the JPEG standard is not well suited for halftone images.

Figure 12:
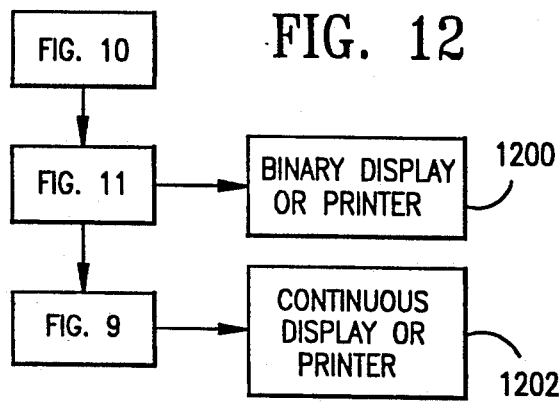
FIG. 12 is a diagram of a flow chart showing an alternative system for the encoding and decoding of digital images in accordance with the present invention.

Utilizing the encoding and decoding system shown in FIGS. 10 and 11 as well as the inverse halftoning system shown in FIG. 9, an alternative system for encoding and decoding digital images is provided. That method is shown in FIG. 12. An image is first compressed or encoded by reducing the gray image, or each channel of a color image, to a halftone, preferably using the blue noise mask disclosed herein. Then, using the remainder of the steps shown in FIG. 10, the information necessary for reproducing the halftone image is further reduced so that the produced halftone image can be stored or transmitted. In order to decompress or decode the stored or received information, the halftone image is reproduced using the decoding method of FIG. 11. Then, the inverse-halftoning method of FIG. 9 is applied to approximately restore the original gray scale, or color channel, image.

Although this method is lossy, the human eye does not perceive the loss when the method is applied to medium and high resolution halftone images. While it is not necessary to utilize the blue noise mask for this encoding and decoding method, since other halftone screens could be used, the blue noise mask is the preferred halftone screen since it results in the reproduction of the highest quality image. Furthermore, the encoding and decoding scheme illustrated in FIG. 12 has the advantage over the JPEG scheme that it is simpler to use and thus operates faster and/or requires less hardware than the JPEG scheme. Also, the raw data of the JPEG scheme is not useful whereas the raw data of the present invention is the halftone image or "error array." That data can be used for either binary or continuous tone output devices, as shown in FIG. 12. The JPEG scheme is designed for continuous tone output devices.

The JBIG (joint Bi-level Image Group) recommendations for binary images are much more complicated and are not optimized for high quality dispersed dot halftone images. Thus, the instant invention offers speed, simplicity, and quality compared with prior art.

Figure 13:
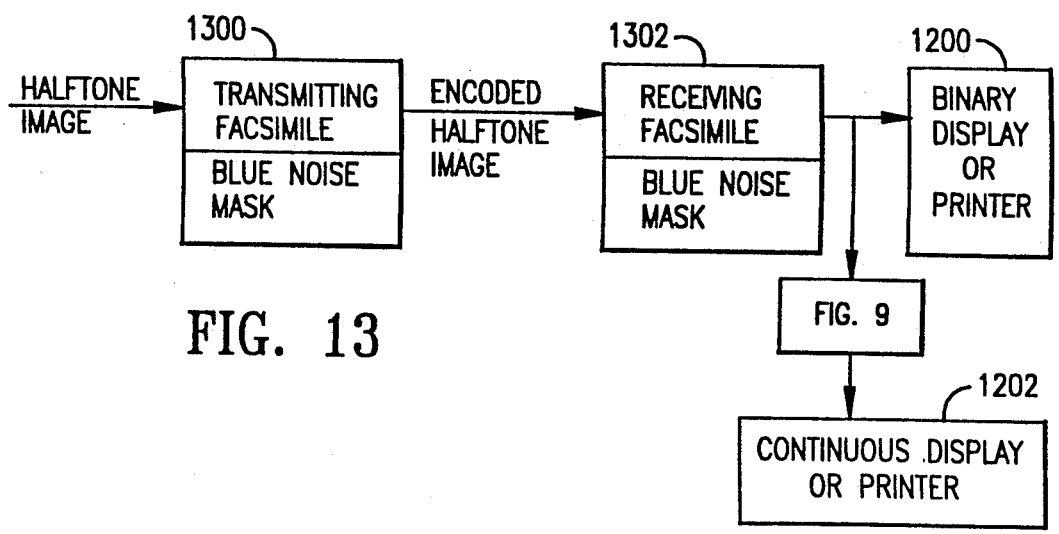
FIG. 13 is a schematic block diagram showing the use of transmitting and receiving facsimile devices for transmitting and receiving a halftone image in accordance with the present invention.

FIG. 13 shows a transmitting facsimile 1300 and a receiving facsimile 1302, each of which has the same blue noise mask stored in its memory. Using the system of the present invention, a halftone image can be transmitted in encoded form by the transmitting facsimile 1300 for receipt and decoding by the receiving facsimile. The decoded halftone image can then be displayed or printed using a binary display or printer 1200 or, after further processing, displayed or printed on a continuous display or printer 1202.

The instant invention can also be applied to color images and facsimile devices. The system shown in FIGS. 9, 10, 11, 12 and 13 can be applied to each color plane of an image, in RGB space, CYMK space, IYQ space, or other color plane spaces. As a modification, the correlation between color planes can be taken advantage of where the block mean levels $g(i,j)$ are computed from only one color plane, and the error arrays $e(i,j)$ are all calculated with respect to the first frame.

Another modification is the application of the instant invention to image sequences. In such an application, the block means values $g(i,j)$ are calculated for the first frame in a correlated sequence, and all subsequent error arrays are calculated with respect to the first frame.

Another modification is the extension of the invention to multiple bit halftones, where, instead of a binary output, the printer or display devices can produce a limited number of output states. In these cases, the processing of binary data in FIGS. 9-13 would be extended to multiple bit data. Specifically, the adaptive run-length filter of FIG. 9, steps 904 and 902, would be modified to search for run-lengths of multiple bit levels, as well as ones and zeros. Furthermore, operations involving the error image array $e(i,j)$ of FIGS. 10 and 11 would be understood to employ modulo b arithmetic (instead of modulo 2) when b-bit level halftone systems are utilized.

Although only a preferred embodiment is specifically illustrated and described herein, it will be readily appreciated that many modifications and variations of the present invention are possible in light of the above teachings and within the purview of the appended claims without departing from the spirit and intended scope of the invention.

What is claimed is:

1. A method for the inverse-halftoning of dot and dispersed dot halftones, comprising the steps of:
   adaptive run-length filtering over at least one of rows and columns and diagonals of said halftones and combining the run-length estimates into an averaged continuous tone image;
   filtering said averaged continuous tone image; and
   removing any impulses and periodicities remaining in the filtered averaged continuous tone image.

2. The method of claim 1, further including the step of dynamically remapping said filtered averaged continuous tone image after removing any of said remaining impulses and periodicities to produce an inverse-halftone image.

3. The method of claim 1, wherein said filtering step uses an adaptive spatial low pass filter.

4. The method of claim 1, wherein said adaptive run-length filter utilizes two-dimensional regions.

5. The method of claim 2, wherein said inverse-halftoning method is applied to a b-bit halftone system.

6. The method of claim 2, wherein said inverse-halftoning method is applied to color images.

7. A method for the inverse-halftoning of dispersed dot and dispersed dot halftones, comprising the steps of:
   adaptive run-length filtering over rows and columns and diagonals of said halftones and combining the run-length estimates into an averaged continuous tone image;
   removing any impulses and periodicities remaining in the filtered averaged continuous tone image; and
   dynamically remapping said averaged continuous tone image after removing any impulses and periodicities to produce an inverse-halftone image.

8. The method of claim 7, further including the step of filtering said averaged continuous tone image prior to removing any impulses and periodicities in said averaged continuous tone image.

9. A method for the inverse-halftoning of dispersed dot and dispersed dot halftones, comprising the steps of:
   adaptive run-length filtering over rows and columns and diagonals of said halftones and combining the run-length estimates into an averaged continuous tone image;
   filtering said averaged continuous tone image; and
   dynamically remapping said filtered averaged continuous tone image to produce an inverse-halftoning image.

10. The method of claim 9, further including the step of removing any impulses and periodicities in the filtered averaged continuous tone image.

11. A method for the inverse-halftoning of dispersed dot and dispersed dot halftones, comprising the steps of:
   generating a halftone image of said continuous tone image to be encoded using a predetermined halftone screen;
   subdividing said continuous tone image into blocks having a predetermined size;
   calculating a local mean continuous tone image for each of said blocks;
   generating a mean halftone image for each of said calculated local mean continuous tone images using said predetermined halftone screen; and
   generating an error image by obtaining the difference between said halftone image and said mean halftone image.

12. The method of claim 11, wherein said method for encoding continuous tone images is applied to a sequence of gray images, color images and halftone images.

13. The method of claim 11, further including the steps of transmitting said local mean continuous tone image for each of said blocks and transmitting said error image.

14. The method of claim 13, wherein said transmitting steps use standard encoding techniques.

15. The method of claim 13, wherein said transmitting steps are performed sequentially.

16. The method of claim 11, further including the steps of storing said local mean continuous tone image for each of said blocks and storing said error image.

17. The method of claim 11, wherein said predetermined halftone screen is a blue noise mask.

18. The method of claim 14, further including the steps of receiving and decoding said transmitted and encoded local mean continuous tone image for each of said blocks and said transmitted and encoded error image to produce said continuous tone image.

19. The method of claim 18, wherein said step of decoding comprises the steps of:
   producing a block mean halftone image from said received local mean continuous tone image for each of said blocks using said predetermined halftone screen; and
   adding said block mean halftone image for each of said blocks to said received error image to generate said halftone scale image.

20. The method of claim 19, further including the step of at least one of printing and storing said halftone scale image.

21. A method for the transmitting and receiving of a continuous tone image, comprising the steps of:
   encoding said continuous tone image using a predetermined halftone screen;
   transmitting said encoded continuous tone image;
   receiving said encoded continuous tone image; and
   decoding said encoded continuous tone image using said predetermined halftone screen to reproduce said continuous tone image.

22. The method of claim 21, wherein said inverse-halftoning method is applied to a b-bit halftone system.

23. The method of claim 21, wherein said inverse-halftoning method is applied to color images.

24. The method of claim 21, wherein a first facsimile machine having the predetermined halftone screen stored in a memory encodes said continuous tone image and transmits said encoded continuous tone image to a receiving facsimile machine, having said predetermined halftone screen stored in a memory which decodes said encoded continuous tone image using said predetermined halftone screen to reproduce said continuous tone image.

25. The method of claim 21, wherein said predetermined halftone screen is a blue noise mask.

26. A system for transmitting and receiving a halftone image, comprising:
   a first facsimile device having a memory in which a predetermined halftone screen is stored;
   means contained in said first facsimile device for encoding said halftone image and for transmitting said encoded halftone image;
   a second facsimile device having a memory in which said predetermined halftone screen is stored; and
   means contained in said second facsimile device for receiving said transmitted encoded halftone image and for decoding said received encoded halftone image.

27. The system of claim 26, wherein said predetermined halftone screen is a blue noise mask.

28. The system of claim 26, wherein said second facsimile device further contains at least one of the means for printing and storing said halftone image.

29. A method for encoding and decoding a digital image, comprising the steps of:

halftoning said digital image using a blue noise mask;
encoding said halftoned digital image;
transmitting said encoded halftoned digital image;
receiving said encoded halftoned digital image;
decoding said encoded halftoned digital image using said blue noise mask to reproduce said halftoned digital image; and
inverse-halftoning said halftoned digital image to reproduce said digital image.

* * * * *

UNITED STATES PATENT AND TRADEMARK OFFICE
CERTIFICATE OF CORRECTION

PATENT NO. : 5,323,247
DATED : June 21, 1994
INVENTOR(S) : Parker et al.

It is certified that error appears in the above-indentified patent and that said Letters Patent is hereby corrected as shown below:

At column 10, lines 23-27 should read:

$$h(x,y) = \sum_{i=0}^{\frac{N}{2}-1} \sum_{j=0}^{\frac{N}{2}-1} p[m;n;f_{ij}] \; rect(\frac{x-mR}{R}) \; rect(\frac{y-nR}{R}) \qquad (2)$$

At column 11, line 44, replace " $f_g = 1\sqrt{2}R$ " with -- $f_g = (1/\sqrt{2})R$ --.

At column 13, line 24, replace "greater" with --less--.

Signed and Sealed this

Fifteenth Day of August, 1995

Attest:

BRUCE LEHMAN

*Attesting Officer*       *Commissioner of Patents and Trademarks*